(12) United States Patent
Templer et al.

(10) Patent No.: US 12,728,892 B2
(45) Date of Patent: Sep. 8, 2026

(54) DRIVER ASSISTANCE SYSTEM AND METHOD FOR PERFORMING AN AT LEAST PARTIALLY AUTOMATIC VEHICLE FUNCTION DEPENDING ON A TRAVEL ROUTE TO BE ASSESSED

(71) Applicant: Volkswagen Aktiengesellschaft, Wolfsburg (DE)

(72) Inventors: Maximilian Templer, Tiddische (DE); Jonas Kaste, Alfeld (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 619 days.

(21) Appl. No.: 18/155,841

(22) Filed: Jan. 18, 2023

(65) Prior Publication Data

US 2023/0227066 A1 Jul. 20, 2023

(30) Foreign Application Priority Data

Jan. 18, 2022 (DE) ..................... 10 2022 200 536.8

(51) Int. Cl.
*B60W 60/00* (2020.01)
*B60W 40/072* (2012.01)
(Continued)

(52) U.S. Cl.
CPC ...... *B60W 60/0011* (2020.02); *B60W 40/072* (2013.01); *B60W 40/105* (2013.01);
(Continued)

(58) Field of Classification Search
None
See application file for complete search history.

(56) References Cited

U.S. PATENT DOCUMENTS 9,205,759 B2 * 12/2015 Pulliam ................... B60L 1/003
9,423,261 B2 * 8/2016 Dorum .............. G01C 21/3819
(Continued)

FOREIGN PATENT DOCUMENTS

DE 102021200889 A1 8/2022 ........... B60W 40/12
DE 102021201698 A1 8/2022 ........... B60W 40/02

OTHER PUBLICATIONS

Kiran, B. Ravi, et al. "Deep reinforcement learning for autonomous driving: A survey." IEEE transactions on intelligent transportation systems 23.6 (2021): 4909-4926. (Year: 2021).*
(Continued)

*Primary Examiner* — Maria S Ayad
(74) *Attorney, Agent, or Firm* — Slayden Grubert Beard PLLC

(57) ABSTRACT

A method for performing an at least partially automatic vehicle function of a vehicle depending on a travel route to be assessed by means of a driver assistance system is disclosed. The method comprises providing a plurality of clusters from route data with respect to at least one known travel route, wherein the clusters group the route data sectionwise according to predefined geometric parameters. The method comprises providing recorded course data that indicate a course of the travel route to be assessed and applying the clusters to the course data in order to divide the travel route to be assessed into route sections corresponding to the clusters. The method comprises determining at least one uncertainty quantity which is characteristic of an uncertainty with respect to the assignment made and determining a control quantity as a function of the uncertainty quantity and providing the control quantity for performing the vehicle function.

20 Claims, 10 Drawing Sheets

(51) Int. Cl.

| | |
|---|---|
| ***B60W 40/105*** | (2012.01) |
| ***B60W 40/107*** | (2012.01) |
| ***B60W 50/00*** | (2006.01) |
| ***G06F 16/28*** | (2019.01) |
| ***G06N 3/092*** | (2023.01) |

(52) U.S. Cl.

CPC ...... *B60W 40/107* (2013.01); *B60W 50/0097* (2013.01); *G06F 16/285* (2019.01); *G06N 3/092* (2023.01); *B60W 2520/105* (2013.01); *B60W 2552/30* (2020.02); *B60W 2556/20* (2020.02)

(56) References Cited

U.S. PATENT DOCUMENTS

| | | | | |
|---|---|---|---|---|
| 10,604,156 | B2 * | 3/2020 | Sorstedt | B60W 60/001 |
| 12,139,134 | B2 * | 11/2024 | Jiang | B60W 60/0015 |
| 2008/0010009 | A1 * | 1/2008 | Miyoshi | G01C 21/30 701/438 |
| 2013/0274986 | A1 | 10/2013 | Trepagnier et al. | 701/26 |
| 2014/0136414 | A1 | 5/2014 | Abhyanker | 705/44 |
| 2014/0236482 | A1 * | 8/2014 | Dorum | G01C 21/3844 701/400 |
| 2015/0191178 | A1 * | 7/2015 | Roy | H04W 4/48 701/36 |
| 2016/0178381 | A1 * | 6/2016 | Lynch | G01C 21/3848 701/41 |
| 2017/0102703 | A1 * | 4/2017 | Lynch | G05D 1/0297 |
| 2017/0293660 | A1 * | 10/2017 | Nachlieli | G06F 16/2457 |
| 2018/0009445 | A1 * | 1/2018 | Nishi | G06N 7/01 |
| 2018/0061226 | A1 * | 3/2018 | Thelen | G05D 1/0278 |
| 2019/0047527 | A1 * | 2/2019 | Falconer | B60W 10/184 |
| 2019/0051172 | A1 * | 2/2019 | Stenneth | G08G 1/163 |
| 2019/0202494 | A1 * | 7/2019 | Itou | B62D 15/025 |
| 2019/0255989 | A1 * | 8/2019 | Rowell | G06V 20/597 |
| 2020/0104714 | A1 * | 4/2020 | Lee | G06N 3/08 |
| 2020/0180650 | A1 * | 6/2020 | Lee | B60W 50/14 |
| 2020/0192393 | A1 | 6/2020 | Aragon | |
| 2020/0241545 | A1 * | 7/2020 | Anthony | G05D 1/0088 |
| 2020/0307561 | A1 * | 10/2020 | Bush | B60W 30/0956 |
| 2021/0165409 | A1 | 6/2021 | Berntorp et al. | |
| 2021/0197825 | A1 * | 7/2021 | Choi | G06V 20/58 |
| 2022/0332345 | A1 * | 10/2022 | Heo | B60W 10/04 |
| 2023/0030104 | A1 * | 2/2023 | Puchkarev | B60W 50/0205 |
| 2023/0227066 | A1 * | 7/2023 | Templer | B60W 60/001 701/23 |
| 2024/0011792 | A1 * | 1/2024 | Wu | G01C 21/3815 |

OTHER PUBLICATIONS

Kumar, Vijay, Jitender Kumar Chhabra, and Dinesh Kumar. "Performance evaluation of distance metrics in the clustering algorithms." INFOCOMP Journal of Computer Science 13.1 (2014): 38-52. (Year: 2014).*

Kumaraswamy, Raksha, et al. "Context-dependent upper-confidence bounds for directed exploration." Advances in Neural Information Processing Systems 31 (2018). (Year: 2018).*

Abramson, Myriam et al., "Tabu Search Exploration for On-Policy Reinforcement Learning," In IEEEProceedings of the International Joint Conference on Neural Networks, vol. 4, pp. 2910-2915, Jul. 20, 2003.

Garcia, Francisco M. et al., "A Meta-MDP Approach to Exploration for Lifelong Reinforcement Learning," arXiv:1902.00843v1, 16 pages, Feb. 3, 2019.

German Office Action, Application No. 102022200536.8, 6 pages, Sep. 26, 2022.

Extended European Search Report, Application No. 22215459.3, 9 pages, May 12, 2023.

* cited by examiner

DRIVER ASSISTANCE SYSTEM AND METHOD FOR PERFORMING AN AT LEAST PARTIALLY AUTOMATIC VEHICLE FUNCTION DEPENDING ON A TRAVEL ROUTE TO BE ASSESSED

CROSS-REFERENCE TO RELATED APPLICATIONS

This application claims priority to German Patent Application No. 10 2022 200 536.8, filed on Jan. 18, 2022 with the German Patent and Trademark Office. The contents of the aforesaid Patent Application are incorporated herein for all purposes.

TECHNICAL FIELD

The present invention relates to a driver assistance system and to a method for performing an at least partially automatic vehicle function depending on a travel route to be assessed.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Driver assistance systems for motor vehicles are known from the prior art. However, in the driver assistance systems available today, it can be observed that they cannot act in a completely reliable and fault-free manner in all traffic situations and environments. This relates, for example, to traffic situations or environments which are unknown to the respective driver assistance system and for which said system has therefore not been trained or optimized, for example. Therefore, in the interest of safety, options are required for handling such situations in a safe and reliable manner.

SUMMARY

A need exists to overcome the disadvantages known from the prior art and to provide a method for performing an at least partially automatic vehicle function, for example a driving function, of a vehicle depending on a travel route to be assessed as well as to provide a corresponding driver assistance system.

The need is addressed by the subject matter of the independent claims. Embodiments of the invention are described in the dependent claims, the following description, and the drawings.

DESCRIPTION

Figure 1:
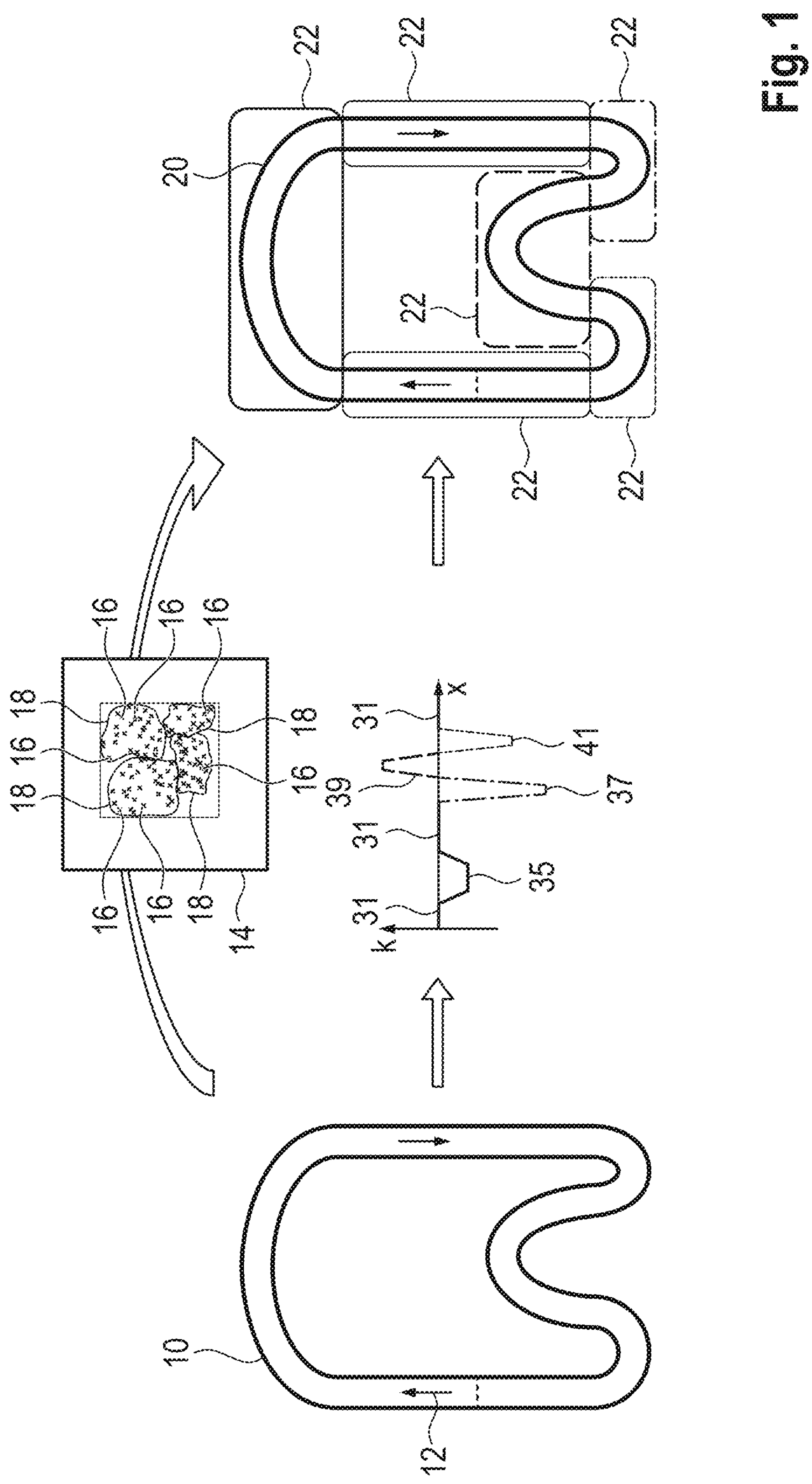
FIG. 1 is a schematic overview for illustrating application of geometric clustering to a travel route.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a (for example computer-implemented) method is provided for performing an at least partially automatic and/or partially autonomous (for example fully autonomous) vehicle function, for example a driving function and/or vehicle guidance, of a vehicle depending on a travel route to be assessed. In some embodiments, the method uses an for example processor-based driving assistance system, and comprises multiple (for example computer-implemented) method steps which are carried out, for example, using an accordingly configured processor (which is for example part of the driver assistance system or is communicatively connected thereto) and/or for example using the driver assistance system, for example automatically.

In the context of this discussion, the terms ‘processor’ and ‘controller’ are understood broadly to comprise hardware and hardware/software combinations to provide the respectively discussed functionality. The respective processor’, ‘controller’, and/or ‘computer’ may be formed integrally with each other and/or with further components. For instance, the functionality of the processor’, ‘controller’, and/or ‘evaluation circuit’ may be provided by a microprocessor, microcontroller, FPGA, or the like, with corresponding programming. The programming may be provided as software or firmware, stored in a memory, or may be provided by dedicated (‘hard-wired’) circuitry.

The driver assistance system (also referred to interchangeably as ‘driver assistance apparatus’ or ‘driver assistance circuit’ herein) may, for example, be or comprise a predefined or rather trained and for example trainable model for performing the at least partially automatic or partially autonomous (for example fully autonomous) vehicle function, for example a driving function and/or vehicle guidance, of the vehicle. This may, for example, be realized in the form of an, for example deep, i.e., multi-layer, artificial neural network or a strategy learned by means of a learning algorithm.

In some (for example computer-implemented) embodiments, a plurality of clusters from route data with respect to at least one known travel route are provided and/or retrieved (for example from an on-board memory apparatus and/or external server), wherein the clusters group the route data for example section-wise (with respect to the known travel route) according to predefined geometric parameters. The plurality of clusters of route data may for example be the result of a previous training process of the driver assistance system during which the driver assistance system was trained based on the travel route, for example.

The vehicle function, which may be performed by means of the driver assistance system, is for example a driving function of the vehicle such as longitudinal guidance of the vehicle and/or transverse guidance of the vehicle.

A travel route may be known (to the driver assistance system) if the driver assistance system was trained or optimized based on said travel route or if the driver assistance system has already performed its task or function along said travel route, either in real life or in a simulation, i.e., for example, has already guided a vehicle along the respective travel route autonomously or in a partially autonomous manner or rather in an at least partially automated manner. A travel route may also be considered known if the travel route is known to another driver assistance system (of the vehicle or another vehicle). Equally, a travel route may be considered known (to the driver assistance system) if, for example, a performance of the driver assistance system has already been determined along said travel route.

The travel route to be assessed may be a current travel route or, alternatively, a section of a route currently being traveled on, based on the current driving situation of the vehicle. The travel route to be assessed may also be a future and/or planned or rather intended travel route that, for example, can be specified by a user of the vehicle (of the driver assistance system) and/or entered by means of a human-machine interface.

The route data specify, for example, geometric properties of the at least one known travel route of the plurality of known travel routes. Said route data may be grouped, i.e., clustered, according to the geometric properties in a property space spanned by corresponding predefined geometric parameters. The geometric properties may in some embodiments therefore be specific values of the predefined (geometric) parameters for the respective travel route, i.e., they may form data points, point clouds, or point groups in the property space. The parameters or rather the geometric properties may, for example, be or describe local curve radii or curvatures, directions of curvature, changes of curvature, road widths, spatial route coordinates, distances of a trajectory to a road edge and/or the like. The route data may, for example, be provided in a computer-assisted manner for simulated unknown travel routes and/or recorded by means of corresponding sensor apparatuses during travel of a measuring vehicle along the travel routes.

In other words, clusters are and/or have been formed based on quantities of trajectory planning (e.g., reference curvature or rather curve curvature, speed, and acceleration) as well as driving scenarios already experienced, or clusters already formed in this way are and/or have been provided.

Furthermore, course data, for example acquired by means of (at least) one sensor and that indicate (at least) a course of the travel route to be assessed are provided (for example in a computer-implemented method step). For example, the course data may be characteristic of a geometric course of the travel route to be assessed and/or of an (for example at least sectional) course of driving dynamics characteristic quantities (for example of the vehicle) along the travel route to be assessed. The course data may, for example, comprise motion data such as speed or acceleration along the travel route. The motion data may be current data of the vehicle and/or, for example, predicted or average values relating to a plurality of vehicles and/or they may be (predefined) limit values.

For example, course data relating to the travel route to be assessed are provided, which data are characteristic of the geometric properties of the travel route to be assessed with respect to the geometric parameters specified (for the route data with respect to the at least one known travel route).

For the travel route to be assessed, the geometric properties thereof, i.e., for example the corresponding data points in the said property space, are determined analogously to the route data of the at least one known travel route, for example from the course data. In other words, the data or properties that were also provided for the at least one known travel route are therefore determined for the respective travel route to be assessed.

For example, the sensor is a sensor of the vehicle that records and/or determines the (for example current) course data and that for example stores said course data for further processing (for example by means of the driver assistance system) on an (for example on-board) memory and/or transmits same to the driver assistance system. Alternatively or additionally, it is also conceivable for at least some of the sensor data to be transmitted to a memory that is external with respect to the vehicle, for example an external server such as a back-end server. It is also conceivable for at least one of the sensor recording the course data to be at least one off-board sensor. This may, for example, be the sensor of another road user such as a vehicle traveling ahead or of an infrastructure system, wherein the course data are for example transmitted via a wireless communication link to the vehicle and, for example, to the driver assistance system.

Alternatively or additionally and in some embodiments, the course data may be non-vehicle-related data, for example map data, which specify or are characteristic of a geometric course of the travel route to be assessed, and/or average driving dynamics characteristic quantities (for example a speed and/or acceleration profile along the travel route to be assessed), which may, for example, be simulated, predicted, and/or derived, for example, from the driving behavior of other vehicles on the travel route to be assessed.

Furthermore, the clusters may in some embodiments be applied to the course data (for example in a computer-implemented method step) in order to for example divide the travel route to be assessed into route sections corresponding to the clusters and, as a result, to assign (for example exactly) one cluster to each of the individual route sections. Route sections corresponding to the clusters should in some embodiments be understood to mean that the respective route sections similar to the clusters respectively assigned to them in terms of their geometric properties (with respect to the predefined geometric parameters) and/or, for example, a correlation of the geometric properties (with respect to the predefined geometric parameters) of the respective route sections with the clusters assigned to them (in the property space) is highest.

For example, the application of the clusters to the course data produces an, for example route-section-based, assignment of the clusters to the route to be assessed. In some embodiments, the assignment of the clusters is based on the travel route to be assessed and, for example, on the respective route sections (for example also determined by means of application of the clusters) of the travel route to be assessed. For example, an assignment of a cluster to the travel route to be assessed or to a route section is selected, for example, such that the travel route to be assessed or the route section of the travel route to be assessed has the highest correlation (for example with respect to the geometric properties) with said cluster in comparison to the remaining clusters of the (entire) plurality of clusters (in the property space).

In some embodiments, the course data are assigned to at most and for example exactly one cluster (for example data point by data point). As a result, the travel route to be assessed may, for example, be split into route sections that are each individually assigned to one of the clusters. As a result, the travel route to be assessed can be evaluated in sections and, for example, a familiarity of the respective route section (and thus of the entire travel route to be assessed) can be evaluated by means of the section-wise assignment of a cluster. This offers the benefit of a very accurate analysis of the travel route to be assessed.

In some embodiments, when the clusters are applied to the course data (for example automatically), a distance from the geometric properties of the respective travel route to be assessed to the geometric properties of the at least one known travel route is determined in the spanned property space. For this purpose, a distance from the corresponding data points in the property space or, for example, a distance from the respective geometric property, i.e., the respective data point, to a centroid, i.e., a geometric center of center point or midpoint of groups or clusters of the geometric properties of the known travel routes, may in embodiments be determined. This may in each case be the centroid of the cluster within the limits of which lies the respective geometric property, i.e., the respective corresponding data point, of the travel route to be assessed. Equally, the respective distance to the nearest centroid can be determined. Multiple individual distances can be determined in this way, depending on the number of the geometric properties determined for the travel route to be assessed. These distances may then be processed further separately or individually. Equally, an average distance from multiple data points to the centroid or centroids may optionally be determined.

Based on the determined distance or determined distances, a familiarity of the respective travel route to be assessed, for example, may be indicated or rather determined. For example, the inverse of the distance can be used directly as a measure of the familiarity, and therefore a larger distance of the geometric properties indicates a lower familiarity, i.e., a lower degree of familiarity, of the travel route to be assessed. Equally, the familiarity may be determined based on the determined distance according to a predefined calculation rule.

In some embodiments, a plurality of geometric properties that were detected or rather determined at a plurality of measuring points along the travel route to be assessed is provided and/or detected and directly assigned into the already existing clusters.

Equally, if there is a plurality of geometric properties for the travel route to be assessed that were determined at a plurality of measuring points along the travel route, they may in turn form clusters in the property space. These clusters formed for the respective travel route to be assessed can then be compared with the clusters of the known travel routes. The distance of the geometric properties can then be determined or given as, for example, similarity, degree of correspondence, overlap, or centroid distance of the cluster or clusters of the respective travel route to be assessed and of the clusters of the known travel routes.

In other words, a degree of similarity or correspondence of the travel route to be assessed with the known travel routes can be determined based on the geometric properties. This may be done for the respective travel route as a whole, for individual sections of the travel route, or for individual points on the travel route.

In some (for example computer-implemented) embodiments, at least one uncertainty quantity is determined which is characteristic of an uncertainty with respect to the assignment made between at least one of the route sections and the cluster (respectively) assigned to said route section. The uncertainty or rather uncertainty quantity describes, for example, a probability of error of the assignment made to a particular cluster. The uncertainty quantity may be characteristic of the uncertainty or rather confidence of the selected cluster assignment of (exactly) one route section and for example for the cluster assignment of multiple route sections of the travel route to be assessed and for example for the cluster assignment (route section by route section) of substantially the entire travel route to be assessed.

In some embodiments, the uncertainty quantity can be determined in that the distances from the corresponding data points (of the route section or rather route sections) in the property space or, for example, the distance from the respective geometric property to the respective centroids of the plurality of clusters (of the geometric properties) of the at least one known travel route can be compared with one another. It is also conceivable, for the determination of the uncertainty quantity, to determine the (for example, average) distance from the data points of the relevant route section to the cluster assigned to said route section and to compare said distance or a quantity characteristic hereof with a (predefined) threshold value.

In some (for example computer-implemented) embodiments, (at least) one control quantity is determined as a function of the uncertainty quantity. For example, the control quantity is provided and, e.g., used for performing the (at least one) vehicle function (by means of the driver assistance system). For example, the vehicle function is performed depending on the cluster assignment of at least one route section of the travel route to be assessed and for example depending on the cluster assignment of substantially the entire travel route to be assessed. For each route section of the travel route to be assessed to which a cluster is assigned, a control quantity may be determined depending on the respectively assigned cluster and provided and used for performing the vehicle function.

In other words, by assigning at least one cluster to the travel route to be assessed, it is possible to determine which of the clusters provided is as comparable as possible with the new travel route to be assessed with respect to predefined geometric properties, for example with respect to geometric parameters of the travel route and/or, for example, with respect to the speed of the vehicle at which the vehicle passes along the travel route to be assessed, the acceleration of the vehicle along the travel route to be assessed, and/or the curve curvature of the travel route. As a result, unknown travel routes to be assessed can be assessed in relation to the already known travel routes.

The proposed method offers the benefit that, not only can a familiarity of the travel route to be assessed be determined, but by determining the uncertainty quantity an uncertainty estimation can be carried out for the assessment of the travel route to be assessed, which uncertainty estimation is beneficially taken into account during performance of the vehicle function. For the determination of the uncertainty quantity, it is proposed to assess the (for example section-wise) assignment of the clusters provided based on known route data to a new travel route to be assessed. The uncertainty estimation beneficially serves as a safety aspect for possible interventions of the vehicle function performed by means of the driver assistance system. If the respectively determined uncertainty quantity of the respective travel route to be assessed is greater than a predefined threshold value, a predefined safety function of the driver assistance system or of a training mechanism for training the teachable model may, for example, be activated automatically.

By determining the uncertainty quantity, the uncertainty of the underlying teachable and/or trained model can thus be analyzed and taken into account during execution of vehicle functions based on the teachable and/or trained model.

In some embodiments, the geometric clustering can be used to assess a familiarity of a travel route for the driver assistance system. In other words, it can be specified whether the respective travel route to be assessed is similar to one or more other travel routes that are already known to the driver assistance system.

This offers the benefit that the performance of the driver assistance system may be determined in a particularly objective manner. For example, the performance may be determined or measured using predefined safety and/or performance parameters, for example compliance with traffic rules, permitted speeds, limits for distances, speeds and accelerations that are classified as safe, predefined comfort limits, for example with regard to an abruptness of maneuvers or a rate of speed and/or direction changes, and/or the like. Equally, the performance may be evaluated in a state space or rather based on travel routes or travel route sections in a state space, wherein, for example, geometric properties of the travel route or rather of the travel route sections may have been specified in the state space. As will be explained in more detail below, the present teachings may then be used to also evaluate the performance of the driver assistance system for travel routes or travel routes sections that are unknown to the driver assistance system up to a first processing. Furthermore, an additional or another metric may be used to determine or rather evaluate, i.e., assess, the performance.

The geometric clustering may therefore be used as an objective quality functional for assessing the generalizability of a (teachable and/or trained) model underlying the driver assistance system. For example, a performance (described in more detail below) of the driver assistance system may be determined in a particularly objective manner using the method of geometric clustering proposed here.

An assignment of new driving situations or rather new travel routes to be assessed may then take place online (i.e., for example during vehicle guidance) in the vehicle for new clusters. A statement may be made regarding the amount of exploration by means of a metric to be defined, for example a distance to the center of the cluster, if applicable the temporal progression of driving dynamics characteristic quantities, or the determinacy of the agent in the respective driving situation (combination with Bayesian approaches are possible here).

In some embodiments, the predefined geometric parameters include one or more of a local curve curvature, a local curvature direction in the direction of travel, a local road width, a local distance of a vehicle trajectory along the travel route to a road edge, a local distance of a vehicle trajectory along the travel route to a lane edge, local spatial route coordinates along the travel route, a local speed of a vehicle along the travel route, and/or a local acceleration of a vehicle along the travel route. In other words, one, multiple, or all of these parameters are therefore specified in order to span the property space. The geometric properties of the travel routes are specified or rather determined as values of these parameters. “Local” here means that the corresponding parameter values, i.e., the corresponding geometric properties, are determined or rather apply at one measuring point on the respective travel route in each case. A plurality of such measuring points may be located along the respective travel route.

In other words, the curvature in the direction of travel, for example, may therefore be specified for a particular travel route for a plurality of measuring points along the travel route in order to establish or specify the geometric properties of the travel route. By using the parameters proposed here, a wide variety of travel routes may be characterized in a robust manner in terms of their geometric properties.

In some embodiments, the geometric properties are grouped in the property space by means of a cluster analysis. The resulting clusters, i.e., groups of data points in the property space, are applied to the course data of the respective travel route to be assessed in order to divide the respective travel route to be assessed into route sections corresponding to the clusters. The familiarity of the travel route to be assessed is then determined individually for these individual route sections. If, for example, a straight portion of the travel route follows on from a curve, the geometric properties determined along or within the curve may be grouped into a first cluster in the property space in terms of a curve curvature and the geometric properties determined along or on the straight portion may be grouped into a second cluster in the property space in terms of the curvature. For example, based on the spatial route coordinates of the data points or geometric properties belonging to a cluster, the corresponding route sections of the travel route may then be determined, for example, by assigning (for example contiguous) route sections into an (for example the same) cluster. The section-wise assessment of the familiarity may provide accordingly detailed data about the respective travel route, i.e., a correspondingly more accurate or robust assessment of the familiarity of the travel route is possible. This then also allows for a correspondingly more accurate or robust assessment of the performance of the driver assistance system.

The travel route to be assessed may therefore be split into multiple route sections, wherein the geometric properties assigned to each route section, i.e., the data points in the property space assigned to each route section, may be analyzed for each route section based on the clusters of the geometric properties of the known travel routes. A degree of correspondence with the known travel routes is determined for each route section depending on this analysis. The degree of correspondence may be determined depending on an assignment certainty, which indicates the certainty or confidence with which a respective data points is or may be assigned to a particular cluster. In other words, the assignment certainty thus describes a probability of error of the assignment made to a particular cluster. The assignment certainty may be determined or rather given depending respective distance from the respective point to the centroid of the corresponding cluster and/or depending on a distribution of data points of the known travel routes assigned to the cluster. The assignment certainty may be less, the greater the distance or rather the more diffuse the respective cluster. Equally, the distribution of the data points assigned to the respective cluster or rather forming the respective cluster may be characterized based on the average distance from said data points to the centroid of the respective cluster, a maximum distance from a data point of the respective cluster to the centroid thereof, and/or a similar metric.

In a similar way to the assignment certainty, the uncertainty with respect to the assignment made between at least one of the route sections and the cluster assigned to said route section may also be determined. The uncertainty may, for example, be determined (for example directly) from the assignment certainty. For example, the uncertainty may be determined or rather given depending on a respective distance from the respective point to the centroid of the corresponding cluster and/or depending on a distribution of data points of the known travel routes assigned to the cluster. The uncertainty may be greater, the greater the distance or rather the more diffuse the respective cluster. Equally, the distribution of the data points assigned to the respective cluster or rather forming the respective cluster may be characterized based on the average distance from said data points to the centroid of the respective cluster, a maximum distance from a data point of the respective cluster to the centroid thereof, and/or a similar metric.

The use of the cluster analysis proposed here allows for an objective and robust grouping of the geometric properties. This produces an objective and robust basis for assessing the familiarity, which can be a significant benefit over a manual or subjective classification or familiarity assessment, especially in the case of longer or more complicated travel routes. This is the case because it has been found that a manual or subjective classification of travel routes in terms of their geometric similarity by eye often does not allow for objectively comprehensible, robust results for assessing the actual familiarity of the respective travel route, i.e., the geometric similarity with one or more other travel routes, and thus ultimately for assessing the performance or generalizability of the driver assistance system or of a learning method used for same.

In some embodiments, the geometric properties are grouped in the property space by means of an iterative cluster analysis. Here, clusters and their cluster center points, i.e., centroids, are iteratively determined under the condition of minimizing the average distances from the geometric properties, i.e., the corresponding data points in the property space, to the cluster center points. In the process, for example, during or after a run or iteration step, new geometric properties, i.e., data, can be taken into account piecewise or travel route by travel route and can then be placed in relation to the clusters or rather cluster center points already determined up to that point. In this way, the clusters or rather the determination of the cluster center points may progressively be refined. As a result, ultimately, a robustness of the determination of the familiarity of the respective travel route to be assessed based on the clusters or rather cluster center points can be improved. In other words, a particularly reliable assignment of the geometric properties of the known travel routes to corresponding clusters may be achieved.

The cluster analysis and/or the provision of the plurality of clusters may not only be performed in a previous training process or rather teach-in process, but rather also during vehicle guidance of the vehicle using the driver assistance system.

In some embodiments, an (for example predefined) extent of interaction of the driver assistance system for performing the vehicle function is changed and/or checked depending on the uncertainty quantity in order to determine the control quantity. The extent of interaction may be the extent of interaction for determining the control quantity. For example, the extent of interaction may indicate the degree or amount up to which the driver assistance system or rather a trainable model is allowed to intervene in the driving process and/or can intervene in the vehicle function. For example, the extent of interaction may indicate the extent to which the driver assistance system (and/or an underlying trainable and/or trained model) is allowed to or rather can explore the environment.

In some embodiments, it may be assessed depending on the uncertainty quantity as to whether an extent of interaction predefined for the driver assistance system is appropriate for the uncertainty with respect to the travel route to be assessed or whether it should be restricted. This offers the benefit that, for example in the case of travel routes to be assessed in which a greater uncertainty with regard to their assignment (to clusters formed based on known travel routes) is assumed, only careful intervention can be carried out. Conversely, in the case of travel routes to be assessed in which a very low uncertainty with regard to their assignment (to clusters formed based on known travel routes) is assumed, a greater extent of interaction for performing the vehicle function can be permitted.

The extent of interaction may, for example, relate to an action space of the driver assistance system and/or a teachable and/or trained model underlying the driver assistance system (for example to an action space of an agent, for example a reinforcement learning agent, also described below), from which action space the driver assistance system and/or the model (for example the reinforcement learning agent) can select or selects an action for performing the vehicle function and/or for determining the control quantity.

An agent may, for example, be a system that acts in an environment (for example in the environment of the vehicle). With regard to the agent, the term "environment" does not necessarily refer to the physical boundaries of the agent but, for example, to all components outside of the agent's decision-making. In this regard, a so-called policy ("strategy" or, alternatively, "course of action" of the agent proceeding from a particular state) and a so-called value function may be approximated, for example. When the agent learns a deterministic policy, its policy delivers an explicit action. If the agent acts according to a stochastic policy, said policy delivers a distribution across all possible actions based on the current state. The action space describes the space of all possible actions. The agent assesses its current state or rather the selection of an action in said state by means of a predefined function, the so-called value function. The output here is, for example, how high the expected reward is for the agent proceeding from the state. It is also conceivable for the agent to assess how good it is to select a particular action in a given state and to subsequently follow its policy. It is also conceivable for the agent to additionally use a model of its environment in order to be able to draw conclusions on the behavior of the environment based on said model. As a result, it is possible to predict the subsequent state or the expected reward for an action taken. "State space", with respect to the agent, refers to the set of all states of the agent.

Building on the use of the geometric clustering as an objective quality functional for assessing the generalizability of a trained and/or teachable model (for example a reinforcement agent), the clustering method is now in some embodiments used to obtain a confidence measure regarding the novelty of the present situation based on geometric characteristic quantities (or rather geometric parameters) as well as quantities for describing a trajectory, namely the speed and acceleration profile. Based on this, the extent of interaction of the driver assistance system and/or the model and/or, for example, the agent (for example the reinforcement learning agent) is changed.

In some embodiments, the uncertainty quantity is assessed with respect to a future (potential) travel route as the travel route to be assessed. In other words, the uncertainty or rather indeterminacy with respect to the future (potential) travel route is predicted. The prediction of the uncertainty or rather indeterminacy of various future driving situations can, for example, influence the performance of the vehicle function, even before this situation arises. As a result, optimized control can be achieved since an improved signal curve can be achieved.

In some embodiments, a teachable model, i.e., a machine learning apparatus, is used as the driver assistance system or as part thereof. A teachable model of this kind may, for example, be implemented by means of or in the form of an artificial neural network.

If the respectively determined familiarity of the respective travel route to be assessed is less than a predefined threshold value, a predefined safety function of the driver assistance system or of a training mechanism for training the teachable model is activated automatically. By means of a safety function of this kind, in the case of a correspondingly large distance or rather correspondingly low degree of familiarity, a corresponding data-driven learning approach for travel routes or route sections with a correspondingly lower familiarity for can, example, be automatically monitored to a greater extent or more intensively. In a training process, for example, corresponding travel routes or route sections can then increasingly be used as training data or a respective result or rather the respective travel route can be marked for manual checking.

During operation of a vehicle equipped with the driver assistance system, a navigation route or rather a trajectory along at least one section of a navigation route, for example, may be automatically determined for an upcoming journey of the vehicle. It may then be checked in the described manner whether or rather to what extent this navigation route or rather the trajectory of the driver assistance system is known. If the familiarity is less than the predefined threshold value, the safety function may be automatically activated in order, for example, to nevertheless enable safe operation of the vehicle along the navigation route. For this purpose, for example, operating parameters of the vehicle, such as the maximum speed thereof, can be reduced or restricted, an escalation threshold may be lowered to initiate predefined measures that intervene in driving operations with increasing intensity, manual vehicle control may be requested at least in places, and/or the like. In this way, too, the safety during operation of the driver assistance system may be improved based on the determined familiarity.

In some embodiments, a teachable model, i.e. a machine learning apparatus, is used as the driver assistance system or as part thereof, and same is trained by means of reinforcement learning based on travel routes specified as training data. In other words, a predefined so-called reinforcement learning agent can therefore be used here to train the driver assistance system, for example for the automated vehicle guidance. The travel routes specified as training data may, for example, be the known travel routes or comprise same. A reward function may be predefined for the reinforcement learning, by means of which a maximization of the performance of the driver assistance system is rewarded. For example, the teachable model or rather the driver assistance system can be trained here by means of reinforcement learning. This is readily possible, since the determined familiarity of travel routes to be assessed, as described, offers a sound option or basis for checking the generalizability of the driver assistance system or rather of the used training method afterwards or in the interim. Therefore, on account of the embodiment proposed here, the driver assistance system may be provided in a particularly effective and efficient manner without having to accept reduced robustness or safety.

In some embodiments, the driver assistance system uses an agent, for example a reinforcement learning agent, to determine the control quantity, wherein the agent is suitable and intended for exploring an environment of the agent, i.e., for researching the environment by means of actions that deviate from the best actions known to the agent, wherein the exploration, for example an exploration rate and/or a decision about further exploration, depends on the uncertainty quantity. For example, the agent determines the control quantity. As a result, a larger reward can be obtained in the long run and, at the same time, the highest possible level of driving safety can be achieved.

The prediction of the uncertainty or rather indeterminacy of various future driving situations can influence the exploration rate, even before this situation arises. This has benefits, above all from a control engineering point of view, since an improved signal curve can be achieved. Therefore, the exploration can be restricted at an early stage during safety-critical driving maneuvers, such that no hazardous situation can arise due to additional exploration.

In some embodiments, the agent generally explores its environment in order to be able to make a better assessment of the state space. Exploration depending on the uncertainty quantity can contribute to the improvement due to the informative added value. This makes it possible for the agent to make its selection of the action (or rather, for example, its selection of the or rather an amount of exploration) depending on the uncertainty of the current driving situation. For example, in the case of a classification of the travel route to be assessed that is deemed to be uncertain, a comparatively small amount of exploration can initially be selected, whereas a comparatively large amount of exploration could be selected in the case of a classification of the travel route to be assessed that is less uncertain.

In some embodiments, it is assessed based on the uncertainty quantity when exploration is required. Many scientific works on exploration strategies deal with the question of which action should be explored (Garcia, Francisco M., and Philip S. Thomas. "A meta-MDP approach to exploration for lifelong reinforcement learning." arXiv preprint arXiv: 1902.00843 (2019)), but not when exploration should and should not take place. However, the latter is directly related to the field of lifelong learning. A convergence of the exploration rate in the case of deterministic methods is also required for the convergence of the algorithm, and therefore exploration cannot take place continuously at will. However, in regions in which the state space has not yet been sufficiently explored or in new driving situations, further exploration is well and truly desired. Therefore, the proposed method (for example by considering the uncertainty quantity) offers another metric for determining when further exploration should take place and when not. Said metric may beneficially address the problem of convergence and, at the same time, handle new driving situations, changing vehicle properties, or customer wishes.

For example, a distance to the center of the cluster (of the respective data points of a route section of the travel route to be assessed) and/or the temporal progression of driving dynamics characteristic quantities (such as the speed and/or acceleration) and/or the determinacy or rather uncertainty of the agent in the respective driving situation can be used as the metric for determining an amount of exploration or rather for making a statement regarding an amount of exploration.

The determination of the determinacy or rather uncertainty of the agent (or rather the uncertainty quantity) may for example be combined with Bayesian approaches.

Alternatively or additionally and in some embodiments, the metric and/or the determined uncertainty quantity may be used to make a decision about further exploration ("lifelong learning"). For example, if the uncertainty in certain regions is high and further exploration does not raise any safety concerns here, it is possible to decide in favor of further exploration.

In some embodiments, a correlation of at least a portion of the course data with respect to the route section and the assigned cluster is determined in order to determine the uncertainty quantity of a particular route section of the travel route to be assessed. In other words, the similarity of the respective route section to the already known route sections may therefore be assessed, for example. Furthermore, a section-wise assessment of the respective uncertainty and thus a locally precise prediction or assessment of the uncertainty along the travel route is possible.

In some embodiments, a cluster center point has been and/or is determined for each cluster and at least the cluster center point of the cluster assigned to the course data to be assessed is taken into account during the determination of the uncertainty quantity. This makes it possible to form a metric in which the distance from the data points (of the course data) to be assessed to the respective cluster center points is determined and thus a correlation with the already known data points (for example from the known travel routes) are determined in a time-efficient manner. The distance to a cluster center point constitutes a meaningful measure of the certainty or rather confidence of the assignment to the respective cluster.

In some embodiments, the uncertainty quantity is determined based on an (for example) relative distance metric on the basis of an arrangement of at least a portion of the course data in relation to an arrangement of at least one cluster center point of a cluster in a property space spanned by the predefined geometric parameters. For example, a quantity characterizing a distance of at least one data point of the course data with respect to the route section and a cluster center point of the cluster assigned to the route section is used as the metric for determining the uncertainty quantity, wherein the distance is determined in a representation in a property space spanned by the predefined geometric parameters. The distance metric may in this case be a normalized distance metric.

During training of an agent and/or model, the used training data are used for determining centroids of the clusters are used. For example, an assignment of new data points to the previously determined centroids then takes place for new routes or rather for the travel route to be assessed. An uncertainty of the data point can be determined by means of the distance from the respective data point to the assigned centroid as well as the average distance in this cluster.

Based on this uncertainty, the actuation signal of the agent can be reduced proportionally to the uncertainty in critical driving situations (high lateral acceleration and control activity).

In some embodiments, a driving situation of the vehicle is assessed with respect to a vehicle stability and/or driving safety and the control quantity is determined depending hereon and as a function of the uncertainty quantity. For example, the vehicle stability and/or driving safety is assessed with regard to the occurrence of critical driving situations such a high lateral acceleration and/or control activity. The control quantity can be increased or decreased as a function of the uncertainty quantity. The control quantity can be reduced as a function of the uncertainty quantity in relation thereto (for example proportionally thereto).

This results in little intervention in situations in which no critical driving situations arise as well as in those in which the uncertainty is low.

For example, adaptive control methods are used for performing the vehicle function due to inaccuracies in system models and predominantly external interfering influences that change dynamically and often as well as complex driving situations. As a result, a continuously high control quality can be guaranteed.

In some embodiments, the control quantity is characteristic of a manipulated quantity in an adaptive control method for performing the vehicle function. The uncertainty estimation or rather the determination of the uncertainty quantity may therefore be used as a safety aspect for possible interventions in the actuation behavior of a reinforcement learning agent in adaptive control strategies.

The reinforcement agent may assume complete control. However, it is for example also possible for the reinforcement agent to be used as an additive actuator. This offers the benefit that, for example, a model-based control (or rather control component) can be combined by means of an additional control (or rather control component) realized by the reinforcement learning agent. As a result, more robust vehicle control can be achieved.

In some embodiments, route data and/or course data are identified which cannot be clearly assigned to a cluster and/or the correlation of which with an assigned cluster is merely low. For example, a further training process of the teachable model and, for example, of the reinforcement learning agent is carried out based on the identified route data and/or course data.

The classification of already known data points in so-called clusters may be used to detect so-called "white spots". "White spots" are subsets of new data clouds that either cannot be clearly assigned to a cluster or that are only very loosely correlated with a cluster. This information is then for example used in a reinforcement learning framework for targeted retraining of an agent.

Therefore, either the exploration can be changed in terms of its rate, as described above, based on the information, thus achieving increased driving safety despite possible exploration, or the agent can be restricted in terms of its actuation activity. Moreover, an assessment of the necessity of retraining can also take place ("lifelong learning").

In some embodiments, the driver assistance system uses a teachable model and an additional training process (of the teachable model) is initiated or prompted depending on the uncertainty quantity. For example, the uncertainty can be utilized during the further training procedure or rather training procedure to take account of situations in which recorded data points cover new regions of the state space (of the agent) and to increase the exploration rate. As a result, the temporal component may be decoupled in the exploration rate.

For example, the further training process is carried out depending on the route data and/or course data that could not be clearly assigned to a cluster and/or that were discovered to have a weak correlation with an assigned cluster. This makes it possible for targeted and thus more efficient retraining to take place.

A known problem in reinforcement learning is the ratio between exploration and exploitation, wherein either the current policy of the agent must be evaluated or further exploration of the state space should take place. If exploration permanently takes place, the current policy can only be assessed to a limited extent. In the case of too little exploration, possible locations in the state space remain unexplored, leaving potential better system states unrevealed.

On account of targeted retraining depending on the uncertainty of the data points with respect to their assignment to a cluster, it is therefore possible to explore hitherto unknown states in the state space in a targeted manner.

In some embodiments, the teachable and/or trained model and, for example, the reinforcement learning agent is based on a deterministic learned strategy ("policy").

Alternatively and in some embodiments, stochastic policies can also be used for this particular application, since these policies intrinsically incorporate the uncertainty by modeling a probability distribution depending on the state space. In this particular application, stochastic policies are slower in terms of convergence and are likewise not suitable for the use of deep deterministic policy gradients, which are for example the algorithm for training the agent. This algorithm requires a deterministic policy with an additional exploration functional.

Some embodiments offer the benefit that, by decoupling the uncertainty determination or rather the determination of the uncertainty quantity from the actual policy, i.e., the learned strategy, a prediction of the uncertainty or rather uncertainty quantity can take place (in the case of stochastic policies, for example if all input quantities (can be/) are determined). In the case where planning quantities are used, these are known with a certain amount of foresight and can thus be used for the a priori determination of the uncertainty or rather uncertainty quantity. This allows for a steadier change to the actuation signal, which is beneficial for the underlying control system (for performing the vehicle function).

In some embodiments, the driver assistance system is selected from a group which (at least) comprises a longitudinal guidance system, for example ACC (short for automatic cruise control), a transverse guidance system, a lane-keeping assistance system, an ESC system (electronic stability control system), an ABS (anti-blocking system), an evasion assistance system, am emergency brake assistance system, a lane departure warning system, a tiredness warning system, and the like, as well as combinations hereof.

The driver assistance system may (in each case) be a system that is able to take over driving in an at least partially automatic manner. It is also conceivable for it to be a driver assistance system which is at least temporarily suitable (and intended) for completely taking over (for example independent) vehicle guidance (for example within defined limits, for example as a traffic jam assistant for reducing the longitudinal guidance relative to the vehicle in front as well as the transverse guidance within the actual lane in the traffic jam). It is also conceivable for the driver assistance system to be suitable and intended for taking over the entire driving task, for example longitudinal and transverse guidance, (over a relatively long period of time)—for example independently of the current driving scenario.

The vehicle function may be a function of a vehicle component of the vehicle, for example a perception function for at least one driver assistance system. For example, the vehicle component is selected from a group that comprises a system for (for example automated and/or partially automated) driving and/or control of the vehicle, a driver assistance system, a navigation system, a warning system, a vehicle safety system (e.g. a braking system), or the like, as well as combinations thereof.

In some embodiments, a vehicle is guided by means of the driver assistance system in an at least partially autonomous or automated manner along the respective travel route to be assessed. A performance of the driver assistance system achieved in the process is then for example combined with the familiarity determined for this travel route, i.e., for example weighted, in order to determine or assess the generalizability or capacity for generalization of the driver assistance system. In other words, it is therefore determined here how well the driver assistance system copes with unknown, i.e., new, travel routes or situations. The familiarity of the respective travel route to be assessed for the driver assistance system can therefore serve or rather be used as a confidence measure for the driver assistance system. A measure for assessing a robustness or reliability of the driver assistance system with respect to automated vehicle guidance on unknown routes, i.e., for assessing the generalizability or capacity for generalization of the driver assistance system, can then be formed in a predefined manner from the familiarity or rather confidence measure and from the performance of the driver assistance system along the travel route to be assessed.

The performance may be determined for the entire travel route to be assessed or for individual route sections specified at another point and corresponding to the clusters or for corresponding or individual driving maneuvers of the vehicle guided by means of the driver assistance system along the respective travel route to be assessed. On account of the combination of familiarity and performance achieved proposed here, it can be taken into account that in general a higher performance of the driver assistance system can be expected on a travel route that is new but relatively similar to the known travel routes than on new travel routes that have a lower familiarity, i.e., differ more significantly from the travel routes already known to the driver assistance system. Accordingly, a higher performance of this kind on a relatively known new travel route makes for a less robust or meaningful indication of the generalizability of the driver assistance system. Accordingly, the performance on travel routes having greater familiarity are relatively underweighted for the assessment of the generalizability. On the other hand, a possibly even relatively poor performance on a particular travel route may nevertheless translate into a relatively good generalizability of the driving assistance apparatus, if this driving route has a very low familiarity for the driving assistance apparatus. Accordingly, the performance on travel routes having lower familiarity are relatively overweighted for the assessment of the generalizability. The generalizability or rather capacity for generalization of the driver assistance system can therefore be determined in a particularly robust manner.

In some embodiments, the performances of the driver assistance system for multiple travel routes to be assessed are determined and combined in order to determine the capacity for generalization of the driver assistance system. The performances are weighted depending on the determined familiarity of the respective travel route. The performance of the driver assistance system for a travel route having a lower familiarity, i.e. the performance of the driver assistance system during guidance of the vehicle on travel routes of which the geometric properties are at a greater distance from the geometric properties of the known travel routes, is overweighted. Conversely, the performance for travel routes having a shorter distance, i.e., greater familiarity and thus greater objective geometric similarity to the known travel routes, is underweighted. On account of the assessment of the capacity for generalization based on the performance of the driver assistance system on multiple travel routes to be assessed, i.e., that are potentially unknown, and the described weighting, an even more accurate, robust, and reliable determination of the capacity for generalization of the driver assistance system is possible. This may, for example, be due to the larger database, since multiple travel routes offer a greater probability that the driver assistance system will be confronted with actually unknown features, geometric properties, or route courses.

The present teachings are also directed to an electronic computer (or processor) for a driver assistance system and/or an, for example processor-based, driver assistance system for a vehicle for performing an at least partially automatic vehicle function, for example a driving function, of a vehicle depending on a travel route to be assessed, which computer is suitable and intended and/or configured for performing the following computer-implemented method steps:

- providing a plurality of clusters from route data with respect to at least one known travel route, wherein the clusters group the route data section-wise according to predefined geometric parameters;
- determining course data that were recorded, for example, by means of a sensor apparatus and that indicate a course of the travel route to be assessed, and applying the clusters to the course data to be assessed in order to divide the travel route to be assessed into route sections corresponding to the clusters and, as a result, to assign one cluster in each case to the individual route sections;
- determining at least one uncertainty quantity which is characteristic of an uncertainty with respect to the assignment made between at least one of the route sections and the cluster assigned to said route section;
- determining a control quantity as a function of the uncertainty quantity and providing the control quantity for performing the vehicle function.

Therefore, within the scope of the driver assistance system according to the teachings herein, it is also proposed that an uncertainty quantity for the analysis of the uncertainty of the driver assistance system is taken into account during the assessment of the (unknown or rather new) travel route to be assessed during determination of the control quantity.

For example, the driver assistance system is configured, suitable, and/or intended for carrying out the above-described method as well as, individually or in combination with one another, some or all of the method steps already described above in conjunction with the method. Conversely, the method can be equipped with all of the features described in the context of the driver assistance system, individually or in combination with one another.

An external server (for example mentioned above or below) should, for example, be understood to mean a server, for example a back-end server, that is external with respect to the vehicle. The external server is, for example, a back end of a vehicle manufacturer or service provider. The functions of the back end or rather external server can be performed on (external) server farms. The (external) server may be a distributed system. The external server and/or the back end may be cloud-based.

For example, the, for example processor-based, driver assistance system comprises the computer. However, it is also conceivable for the driver assistance system to be communicatively connected (for data exchange) with the computer and for the computer to be provided in the form of an external server (and/or distributed system), for example as a back-end server.

The teachings herein are also directed to a vehicle, for example a motor vehicle, comprising an above-described driver assistance system for a vehicle according to some embodiments. For example, the vehicle may be a (motorized) road vehicle.

The vehicle may be a motor vehicle which is, for example, a motor vehicle controlled by the driver themselves ("driver only"), a semi-autonomous, autonomous (for example, of autonomy level 3 or 4 or 5 (of standard SAE J3016)), or a self-driving motor vehicle. Level 5 autonomy describes fully automatic vehicles. The vehicle is for example a vehicle from the transport sector. Equally, the vehicle may be a driverless transport system. The vehicle may, in this case, be controlled by a driver or drive autonomously. Moreover, in addition to a road vehicle, the vehicle may also be an air taxi, an airplane, and another means of locomotion or another type of vehicle, for example an aircraft, watercraft, or rail vehicle.

The teachings herein are also directed to a computer program or computer program product, comprising programming means, for example a program code which represents or codes at least some and for example all of the method steps of the method according to the teachings herein and for example one of the described embodiments and is designed for execution by means of a processor.

The teachings herein are also directed to a data memory on which at least one embodiment of the computer program according to the teachings herein or a specific embodiment of the computer program is stored.

The present invention has been described with respect to a vehicle and a driver assistance system for a vehicle. However, the method can also be applied outside of the automotive sector for safety functions in methods for automatically or semi-automatically performing functions, for example when using reinforcement learning agents, and can be transferred hereto with respect to the determination of the exploration rate and/or an amount of exploration and/or further exploration and/or targeted retraining (in each case depending on an uncertainty quantity determined in analogy to the above embodiments on the basis of the training data and/or course data). The applicant reserves the right to claim a method and assistance apparatus directed thereto as well.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Machine learning methods as well as data-driven methods allow for efficient mapping based on already seen scenarios or situations with the possibility of interpolation between known scenarios. However, for many methods, extrapolation onto new scenarios, also summarized under the term "generalizability of the method", constitutes a problem. In the field of driving maneuvers, however, it is not always trivial to distinguish when it is interpolation of already known driving maneuvers or route sections and when it is extrapolation. A metric which assesses the familiarity, i.e.

the novelty, of a new route or individual route sections from the point of view, for example, of a driver assistance system for guiding the vehicle along the new route can be used with the data of already known routes to better classify results of the driver assistance system, i.e., its performance along the respective new route.

The driver assistance system may, for example, be or have been trained by means of reinforcement learning, in that a predefined agent explores its environment and learns an optimized operation, for example for guiding the vehicle along a route, based on the observed scenarios, i.e., the known routes or driving maneuvers. Such operations or actions may, for example, be or include an adjustment of steering angles and speeds during automatic travel, i.e., actions for the transverse and longitudinal guidance of the vehicle. Since this is typically inefficient in terms of data, i.e., a large amount of accordingly prepared data is required in order to optimize the operations of the agent, an initial evaluation or rather learning of the routes or scenarios or rather operations suitable therefor often takes place at the simulation level. The transposition from such a simulation to reality and from known routes or driving maneuvers to unknown routes or driving maneuvers must then be evaluated. Here, a confidence assessment with respect to the familiarity is useful as a qualitative classification for assessing operations, i.e., ultimately the performance of the agent, since the quality of the agent can be better assessed in this way.

Previous approaches often focus either on evaluating the performance of the agent or rather a strategy (policy) learned by same for unknown scenarios, in this case unknown travel routes or route sections, or to investigate the variance of a respective environment and then the performance of a pre-trained strategy. As a result, either scenarios or an underlying Markov decision problem are varied. This produces the disadvantage that merely the result, i.e., the performance of the agent, is taken into account, however no statement is made as to the relationship between said performance and the respective scenario, as to how said performance is therefore to be assessed, or how meaningful this performance is. If new, presumably unknown scenarios only deviate relatively little from scenarios presented during training of the agent, this relativizes the performance of the agent, i.e., a corresponding generalizability. Known solutions are often also used in simulative frameworks and, in reality, first require experimentally determined data. In addition, in previous approaches, a statement regarding the generalizability is often made more difficult, since the performance may be bad either on account of a distributional shift in the state space, since then the underlying Markov decision problem is altered, or on account of the coverage of the state space in general.

In the following, a method will be described which can already perform an a priori assessment of a state space, i.e., of given geometric data or properties of a new route, for example, which can be used directly in an experimental determination of corresponding data under certain circumstances.

In this regard, FIG. 1 shows a schematic overview in which, inter alia, a training route 10 is shown schematically. This training route 10 may be traveled on by a motor vehicle in a particular training travel direction 12. Route data 14 of the training route 10 are recorded along the training route 10 at a plurality of measuring points, which route data indicate the geometric properties as values of predefined geometric parameters. The training route 10 may in this case be representative of a plurality of other travel routes which, like the training route 10, can be used to train a driver assistance system or rather a teachable model of a driver assistance system, for example for automated vehicle guidance.

The route data 14 are in this case represented schematically by means of geometric values 16 recorded at the individual measuring points along the training route 10, only some of which geometric values are marked for the sake of clarity. The geometric values 16 are entered into a property space which, here, is also merely schematically indicated and which is spanned by the predefined geometric parameters. A clustering method is then applied to the route data 14 or rather the geometric values 16, which forms clusters 18 based on the geometry of the associated training route 10.

To further illustrate the geometric properties of the training route 10, the center of the graph shows a curve curvature K plotted over a route coordinate or route position X, which indicates a current position along the training route 10 in the training travel direction 12. It can be seen that there are some straight, i.e., curve-free, sections along the training route 10 that are connected by means of curves with different curve curvatures K. The corresponding curves are represented here by means of deflections from the X-axis. Deflections in the positive and negative K direction represent different directions of curvature, i.e., left and right curves. These deflections and the intermediate straight sections coincide with or correspond to the clusters 18.

The clusters 18 can be determined by means of an, if applicable iterative, cluster analysis. For example, clustering may be carried out multiple times in order to minimize an average value of distances from the individual geometric values 16 of one of the clusters 18 in each case to centroids, i.e., the geometric center point, of the respective cluster 18.

The clusters 18 ultimately determined in this manner can then be applied to the training route 10. This produces a corresponding segmented training route which is divided into multiple training route sections 22 according to the clusters 18 or rather the geometric properties represented by said clusters. In this way, regions of the training route 10 that have the same or similar geometric properties are in each case matched with the clusters 18 and assigned to one of the clusters 18 that represents corresponding geometric properties. After training is complete, the clusters 18 correspond to the known route sections. Said route sections can be handled, for example, by the respective driver assistance system with known performance.

FIG. 1 illustrates a first step of clustering based on the curve curvature, for example. Formed centroids of the individual clusters are then used for the further assignment of the clusters.

Figure 4:
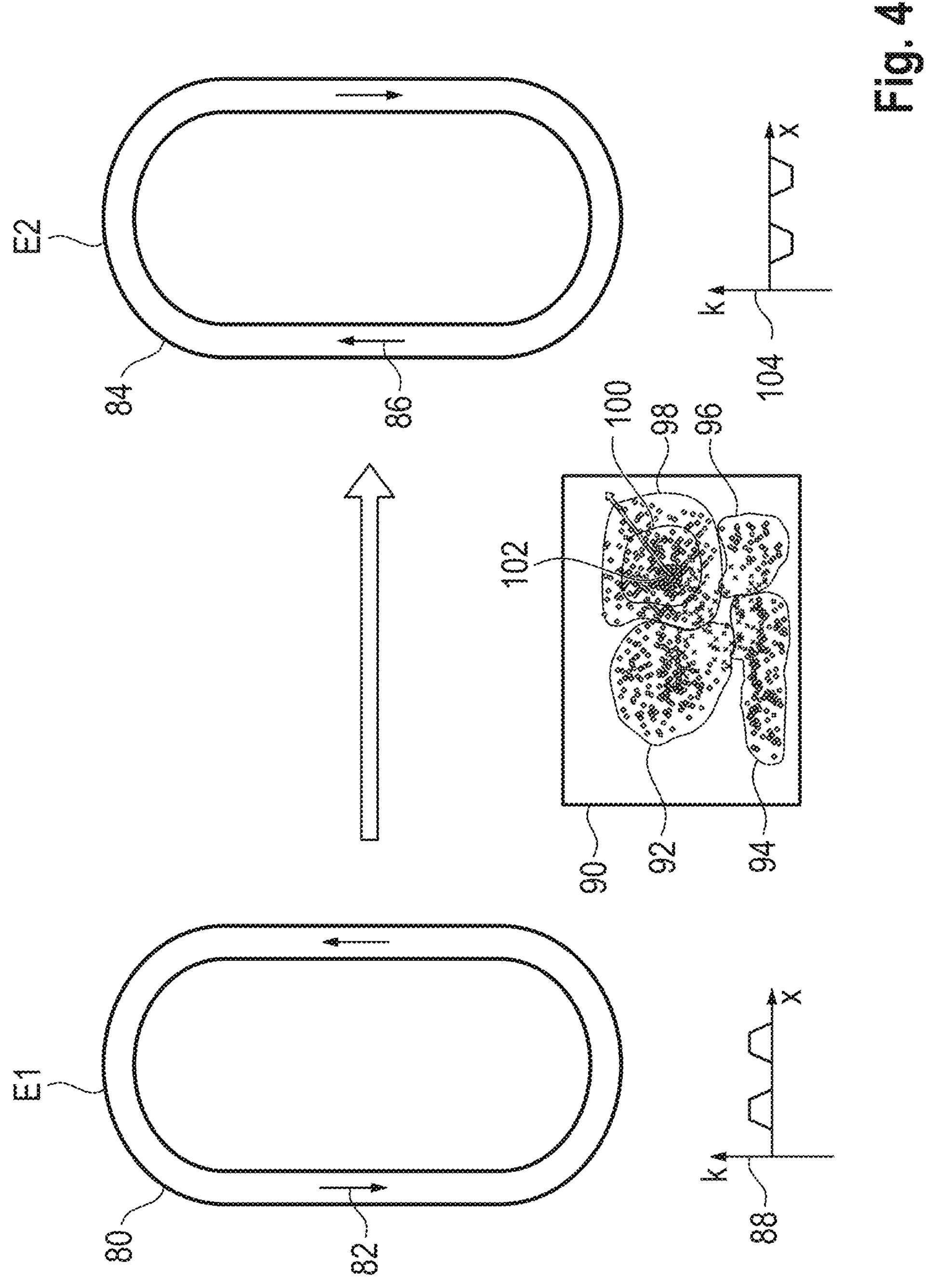
FIG. 4 is a schematic overview for applying the geometrically determined clusters to a new travel route.

FIG. 4 is a schematic overview for applying the geometrically determined clusters to a new, potentially entirely or partially unknown travel route. By way of example, there is a first (in this case closed) evaluation route E1, which is denoted by the reference sign 80, and a second (in this case closed) evaluation route E2, which is denoted by the reference sign 84. The reference sign 82 denotes a first travel direction (in this case counterclockwise) in which the evaluation route E1 is being traveled on. Here, the evaluation route E2 is formed from the evaluation route E1 in that the evaluation route E2 is traversed in the opposite travel direction 86 (in this case clockwise) compared with the evaluation route E1.

The two graphs 88 and 104 each show the curve curvature k of the evaluation route E1 (graph 88) and E2 (graph 104) as a function of the route meters (i.e., for example, as a function of the distance traveled). Since the two evaluation routes E1 and E2 are traversed in opposite directions, the course of the curve curvature from the graph 104 is mirrored with respect to that from the graph 88 on the X-axis (approximately unit in route meters). Both evaluation routes each have two straight, i.e., non-curved, sections, which is why the course of the curve curvature extends along the x-axis (and the curvature is zero) in each case at two sections.

The geometric route data can, in turn, be represented in a graph 90 and the respective route can be segmented by applying the clusters 92, 94, 96, 98 to the evaluation routes E1 and E2 and the individual segments can therefore be assigned in each case to one of the previously determined clusters.

The reference sign 100 denotes a region in which data points at a shorter distance from the cluster center point 102 of the cluster 98 previously formed (using the test route) are arranged. The route sections which are reflected by these data points lying within the region 100 exhibit a comparatively higher similarity to sections of the test route with respect to the data points which lie only in the outer ring outside the region 100 and within the region 98.

Figure 5:
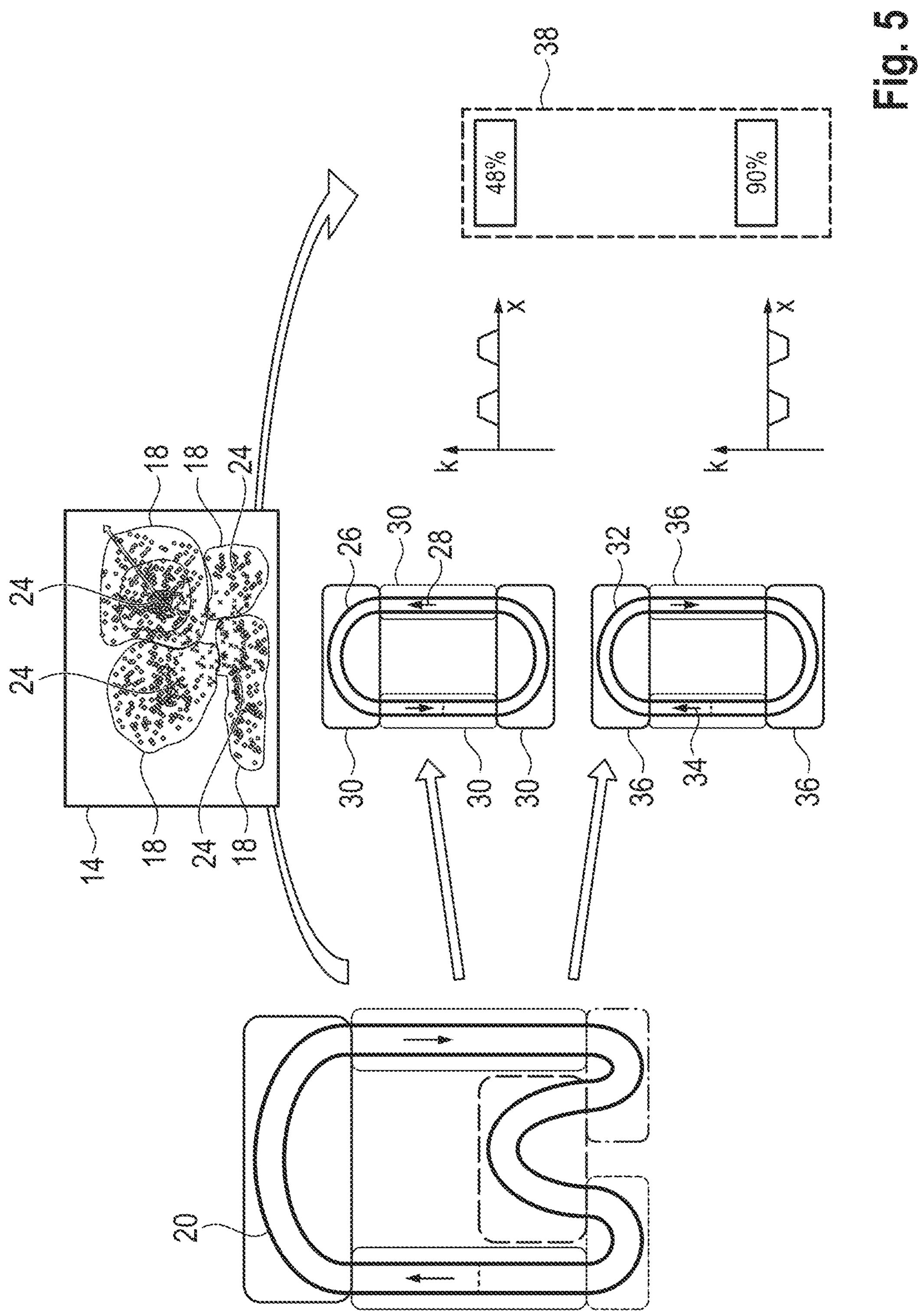
FIG. 5 is a schematic overview for illustrating an assessment of a familiarity of a travel route based on the geometric clustering.

FIG. 5 is a schematic overview of application to a new, potentially entirely or partially unknown travel route.

Now, for example following the first clustering step illustrated in FIG. 1, the geometrically determined clusters can be applied to evaluation routes, for example in a second step. For this purpose, the route is for example segmented and the individual segments are allocated to previously determined clusters.

For example, in a further step especially following on from the second step, the confidence measure is determined based on the correspondence between the clusters (the higher the correspondence, the more similar the elements of the evaluation route compared with the training route).

By way of example, a first evaluation route 26 and a second evaluation route 32 are specified here (see also FIG. 4), the familiarity of which is to be assessed automatically relative to the at least one known training route 10. The first evaluation route 26 can be divided into first route sections 30 by applying the clusters 18. Likewise, the second evaluation route 32 can be divided into second route sections 36 by applying the clusters 18. In the present case, the first evaluation route 26 and the second evaluation route 32 differ, by way of example, in that a first travel direction 28 provided for the first evaluation route 26 extends in an opposite direction to a second travel direction 34 provided for the second evaluation route 32. In other words, the first evaluation route 26 and the second evaluation route 32 were or are traversed in opposite directions.

As described for the training route 10, geometric data of the evaluation routes 26, 32 may be recorded and entered into the property space spanned by the predefined geometric parameters. Said geometric properties of the evaluation routes 26, 32 are then assessed in each case based on the determined clusters 18 in order to detect whether the respective evaluation route 26, 32 comprises already known route sections, i.e., regions of an already known geometry represented by the clusters 18. The geometric properties determined in a pointwise or section-wise manner along the evaluation route 26, 32 can therefore be assigned to one of the clusters 18 in each case. For this purpose, for example, a distance to the centroids, i.e., cluster center points 24 of the clusters 18, can be determined, wherein the assignment can then be made to the cluster 18 to the cluster center point 24 of which there is the smallest distance in the property space. Therefore, if a new travel route is traveled on, a statement can be made about the familiarity or rather novelty of a respective route element by means of the distance of the geometric properties from the route elements thereof to the cluster center points 24.

A certainty or reliability or rather probability of error of the assignment of particular geometric properties or rather measuring points or route sections to one of the clusters 18 may increase with increasing distance from the respective cluster center point 24. This results in a specific confidence measure 38 that indicates the familiarity of the respective new route, in this case the evaluation routes 26, 32, in the context of or relative to the at least one known training route 10 or rather the geometric properties thereof.

In the present example, the first route sections 30 of the first evaluation route 26 comprise two straight, i.e., curve-free, route sections, for which a correspondence with one of the clusters 18 can be found, since the training route 10 also comprises corresponding straight training route sections 22. However, the first evaluation route 26 also comprises first route sections 30 which correspond to a left curve with a relatively low curve curvature K for which there is no exact match in the training route 10. Accordingly, the first evaluation route 26 is therefore to be classified as partially known, which results, for example, in a degree of familiarity of 48% as the confidence measure 38 for the first evaluation route 26 based on the correspondingly relatively low degree of correspondence with the clusters 18 or rather a relatively large distance to the cluster center points 24 thereof.

In contrast, the second evaluation route 32 comprises, in addition to the straight, curve-free sections, second route sections 36 which represent a right curve with a relatively low curve curvature K due to the opposite second travel direction 34. There is an at least partial match for said second evaluation route in the training route 10, since the training route 10 also comprises such a right curve in the training travel direction 12, albeit with a somewhat different curve curvature K. Therefore, a correspondingly shorter distance to one of the cluster center points 24 in each case can be determined for all of the second route sections 36 of the second evaluation route 32. However, since the second evaluation route 32 does not correspond exactly to the segmented training route 20 or rather to the training route sections 22 thereof in terms of its geometry, no 100% match is determined, but rather a degree of familiarity of, for example, 90% as the confidence measure 38 for the second evaluation route 32.

The statement made based on the confidence measure 38 with regard to the familiarity makes it possible to use corresponding information for safety functions that can be monitored by means of a data-driven approach for route sections of lower familiarity, and allows for a particularly meaningful assessment of how, for example, a machine learning approach, for example a reinforcement learning agent, used to train the respective driver assistance system will act or rather perform on unknown routes.

The higher the confidence measure 38, i.e., the more accurately, clearly, or reliably the geometric properties or rather the corresponding data points in the property space of the respective assessed travel route or respective travel route to be assessed can be assigned in each case to one of the clusters 18, the more probable it is that the travel route or rather a respective route section is known.

The confidence measure 38, i.e. the familiarity of the corresponding route sections or of the travel route as a whole, can then be incorporated into an assessment of a generalizability or capacity for generalization of the respective driver assistance system or rather a training method or training apparatus used to train same, for example the reinforcement learning agent. For this purpose, the performance of the driver assistance system is investigated, after same has been trained, on various test routes, i.e. in this case using the evaluation routes 26, 32, for example. In order to be able to make a statement about the adaptation to new environments, i.e., travel routes or route sections, the route geometry thereof is objectively described, for example, in an unmonitored learning approach by means of the above-explained geometric clustering. In the process, differences between the route geometry in a training dataset—i.e., in this case of the training route 10, for example—and in the respective test dataset—i.e. in this case the evaluation routes 26, 32, for example—are uncovered. If the route geometries differ significantly from one another, this can be used in the form of a correspondingly low confidence measure 38 as a weighting for assessing the driver assistance system during unknown driving maneuvers or rather along unknown travel routes. In contrast, in the case of relatively small differences between the route geometries, i.e., a relatively high degree of familiarity or rather relatively high confidence measure 38, the assessment of the generalizability can be weakened. Therefore, in order to assess the generalizability, the performance of the driver assistance system determined on a new travel route as well as the confidence measure 38 determined for said travel route can be taken into account, for example by means of a predefined combination or weighting. This can be carried out in an intermediate step during the training to evaluate training progress of the driver assistance system as well as after the training has finished, i.e., at the time of inference.

The methods described here allow for a more objective assessment of the performance of a data-driven learning approach in new environments, i.e., during the processing of new data that were not used, for example, during training, than with conventional approaches. Objectivization of this kind may take place in an automated manner by using geometric clustering as the assessment metric or rather as the basis for determining the familiarity of the assessment metric. Therefore, a particularly quick test or check of the robustness of a corresponding algorithm is made possible by means of particularly simple detection of previously unconsidered, i.e., unknown, driving maneuvers or route sections. Previous approaches, in which, for example, a test route is subjectively compared in a purely visual manner with the at least one training route 10, can only be meaningful to a limited extent in practice with regard to the capacity for generalization of the respective algorithms, since is not it determined how significantly or to what extent the travel routes objectively differ from one another. Therefore, in approaches of this kind, a relatively large amount of expert knowledge and manual work is required, which is linked to corresponding costs. This can be saved using the presently described method, wherein said method is not subject to any restrictions in terms of a possible geometric complexity or complicatedness of travel routes to be assessed.

Overall, the examples described show how geometric clustering can be used as a measure of the confidence for an assessment of the generalizability of a teachable model, for example a reinforcement learning agent for adaptive control strategies of automatic driving functions, in order to ultimately allow for a particularly safe approach of a corresponding driver assistance system, i.e., particularly safe automatic driving operation of a motor vehicle.

The geometric clustering was already introduced above with reference to FIGS. 1, 4, and 5 as an objective quality functional for assessing the generalizability of a reinforcement learning agent for adaptive control strategies of automatic driving functions.

Building on this, the clustering method is now used to obtain a confidence measure relating to the novelty of the present situation based on geometric characteristic quantities as well as quantities for describing a trajectory, for example namely the speed and acceleration profile. Based on this, the agent is then altered in terms of the extent to which it interacts. The classification of already known data points in so-called clusters should for example then be used to detect white spots. These are subsets of new data clouds that either cannot be clearly assigned to a cluster or that are only very loosely correlated with a cluster. This information is then used in a reinforcement learning framework for targeted retraining of an agent. Therefore, either the exploration can be changed in terms of its rate based on the information, thus achieving increased driving safety despite possible exploration, or the agent can be restricted in terms of its actuation activity. Moreover, an assessment of the necessity of retraining can also take place (so-called "lifelong learning").

In current approaches, exploration rates in deterministic policies are usually regulated over time, and therefore extensive exploration takes place at the beginning and decreases over time. In the case of stochastic policies, the exploration rate is adapted based on past experiences and is thus directly part of the policy.

There are also heuristic methods for exploring the search space, for example a tabu search (cf. e.g., Abramson et al., *Tabu Search Exploration for On-Policy Reinforcement Learning*, In: 4. 10.1109/IJCNN.2003.1224033, 2013), which assess possible solutions and limit a temporal selection thereof. The tabu list can serve as a selection criterion for how often a particular action has been used, but it only provides reduced informative added value in a high-dimensional state and action space.

There are also Bayesian approaches, which can provide informative added value with regard to the determinacy (certainty) of an action in a given state. Another possibility in the field of exploration for reinforcement learning is meta-learning, in which an exploration function is learned in addition to the policy (Garcia, Francisco M., and Philip S. Thomas. "A meta-MDP approach to exploration for lifelong reinforcement learning." arXiv preprint arXiv:1902.00843 (2019)).

In the case of deterministic policies and the associated exploration, this is time-dependent and moreover takes place under rigid requirements and does not consider the current situational information content.

Nevertheless, the exploration quality cannot be predicted in this case either since the observation state of the agent is not known "a priori" and thus no statement can be made as to which how much the agent explores in which situation. Since, in some situations, regardless of the information content, exploration is somewhat undesired or is only desired to a very limited extent (driving at the limit without a safety margin), predicting the uncertainty with regard to future driving situations in combination with the exploration rate has significant added value.

The tabu list is not suitable for high-dimensional state or action spaces since ambiguity of individual data points is usually less present here. In the above-mentioned publication in the field of Bayesian methods (Garcia, Francisco M., and Philip S. Thomas. "A meta-MDP approach to exploration for lifelong reinforcement learning." arXiv preprint arXiv:1902.00843 (2019)), a focus is on the suitable selection of the action during exploration and a general deliberation as to whether exploration should take place does not take place. It also focuses on exploration for different tasks (different MDPs-MDP is an acronym for "Markov Decision Process"), which can be used in a meaningful manner, for example, for various vehicle derivatives. However, this publication does not consider improving or adapting exploration of a policy for a specific MDP (e.g., a vehicle).

Previously, safety functions were introduced that monitor the vehicle stability and trained safety drivers in combination with additional manual monitoring of the algorithm during the driving attempts.

Clusters are formed based on quantities of the trajectory planning (e.g., reference curvature, speed, and acceleration) and already experienced driving scenarios. An assignment of new driving situations can then take place for new clusters online in the vehicle, as explained above within the context of FIG. 1.

A statement can be made regarding the amount of exploration by means of a metric to be defined, for example a distance to the center of the cluster, if applicable the temporal progression of driving dynamics characteristic quantities, or the determinacy of the agent in the respective driving situation (combination with Bayesian approaches are possible here). This is illustrated with reference to FIGS. 2*a* to 2*f*.

Figure 2A:
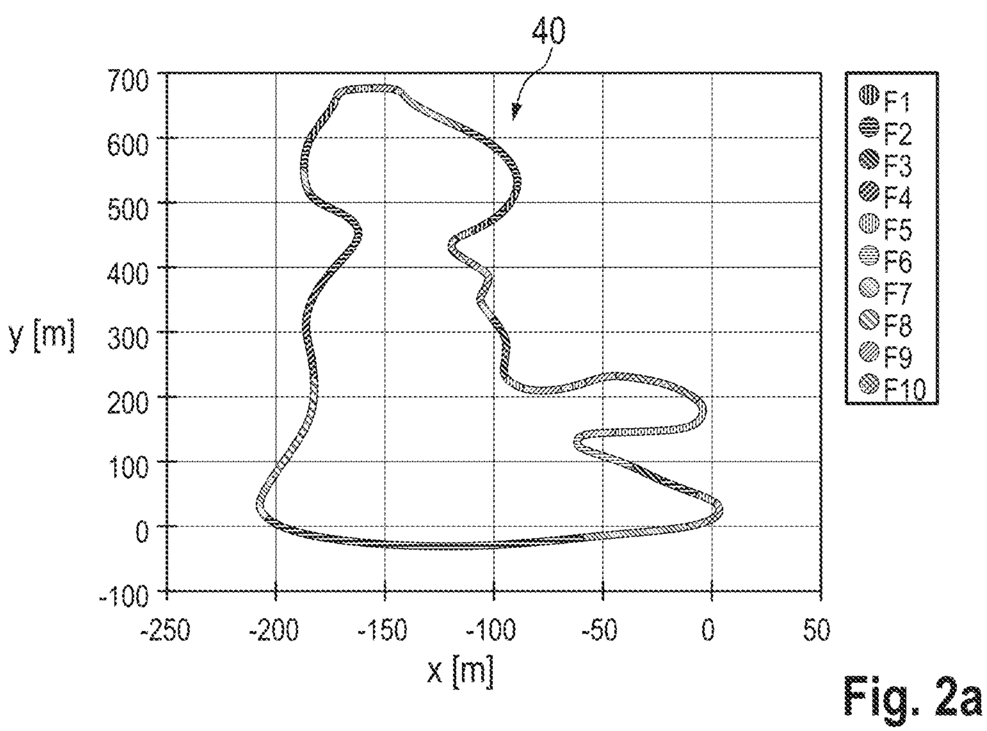
FIGS. 2*a*-2*f* are an exemplary illustration for deriving a statement regarding an amount of exploration by means of the proposed method according to one embodiment.
Figure 2B:
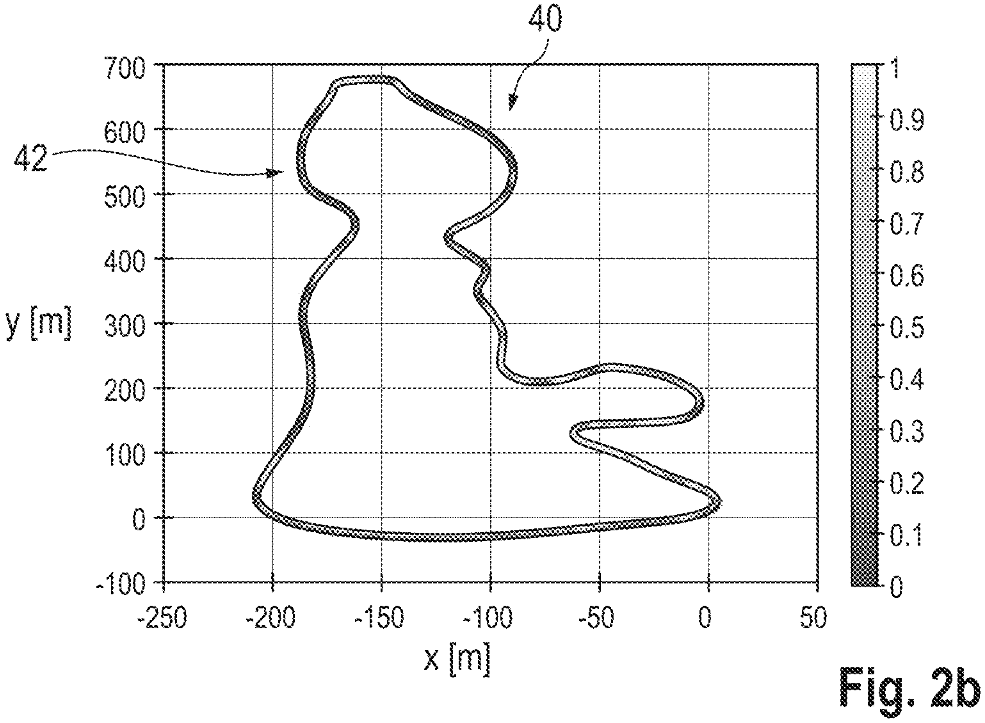

FIGS. 2*a* to 2*b* illustrate a first step in which the clustering takes place based on the route data of a training route 40. By means of a cluster analysis, the training route is divided into a plurality of route sections, wherein the route points of each route section are assigned to (exactly) one cluster.

In the case of the training route 40 used in FIG. 2*a*, the cluster analysis 10 performed here has produced various clusters that are characterized by different pattern types. In other words, each of the ten pattern types F1 to F10 characterizes the affiliation to (exactly) one particular cluster.

In FIG. 2*a*, the assignment of the individual route sections is illustrated by means of the respective pattern type of the cluster to which said route section is assigned. It can be seen that multiple (non-adjacent) route sections (which, for example, have a similar curvature course) are assigned to the same cluster.

For each route point of the training route, it is then possible to determine how well the respective route points are approximated by the clusters formed, for example in that the distance of the respective data point (which is assigned to the route point) to the previously determined centroid (of the cluster in which the data point lies) is determined. In FIG. 2*b*, a normalized distance (normalized in the range of between 0 and 1) to the (respective) cluster centroid is shown in the representation 42 for each route point.

Figure 2C:
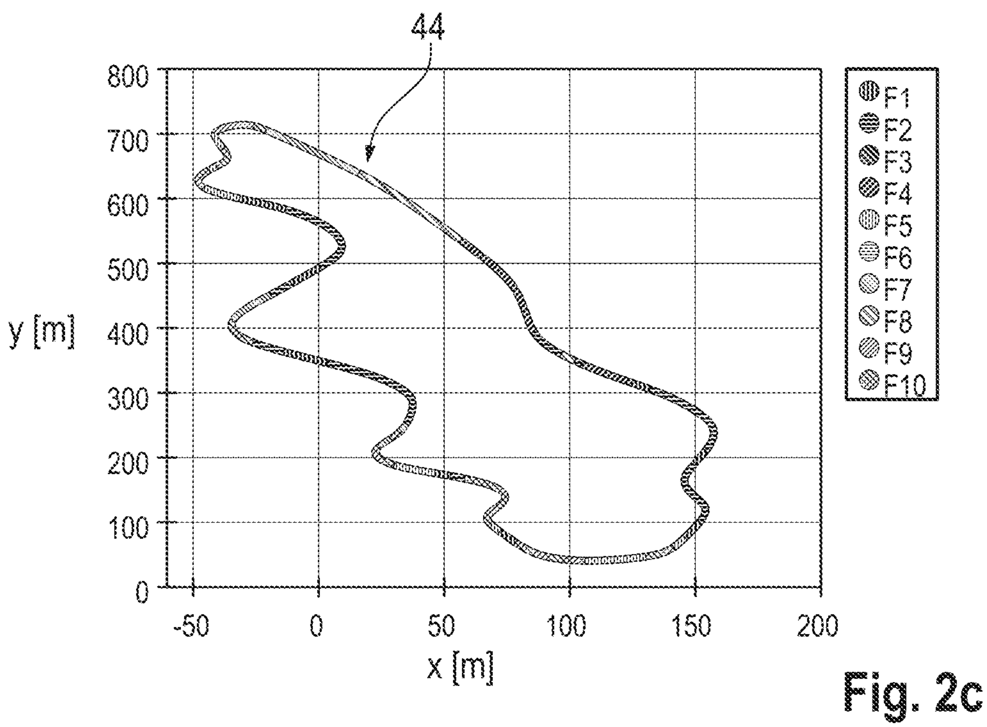
Figure 2D:
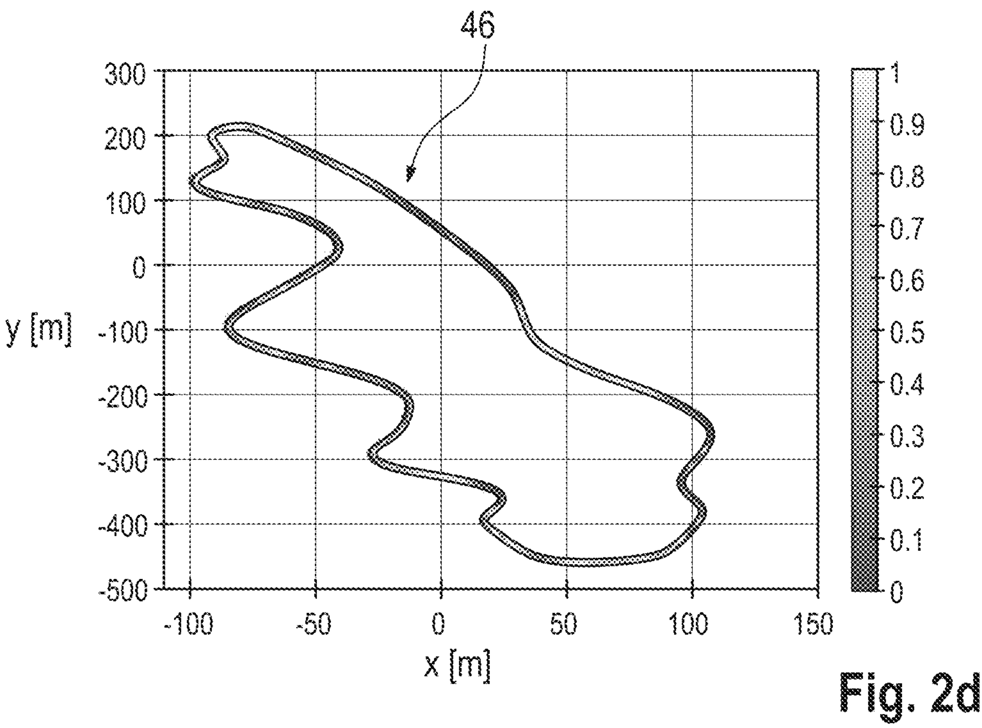
Figure 2E:
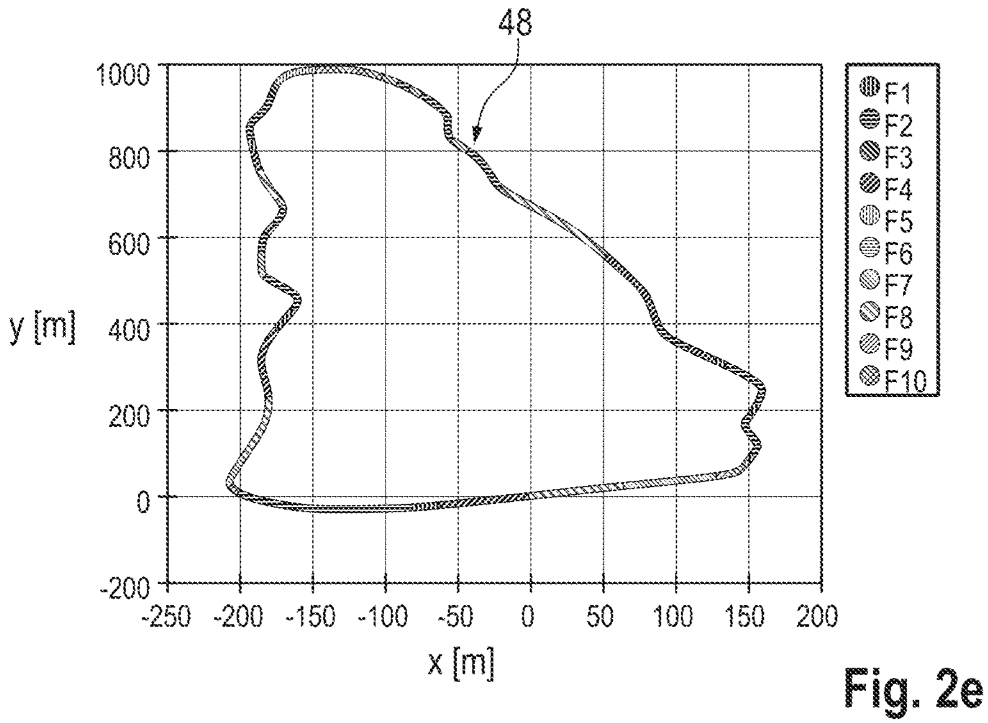

FIGS. 2*c* and 2*e* illustrate a second step in which an assignment of new data points of the new route to the previously determined clusters (and thus centroids) from FIG. 2*a* is performed. In this step, the clusters formed (illustrated by FIG. 2*a*) in the first step are applied to the route data of the two previously unknown routes 44 (see FIGS. 2*c*) and 48 (see FIG. 2*e*). For this purpose, the two routes 44 and 46 are divided into route sections in accordance with the clusters formed on the basis of the training route 40. Each of the route sections produced in this manner is assigned to one of the previously formed clusters. This produces a clustered course in each case in FIG. 2*c* and in FIG. 2*e*.

The assignment to a particular cluster is illustrated here, as in FIG. 2*a*, by means of the different patterns of the respective route sections according to one of the ten different pattern types F1 to F10 in each case.

Figure 2F:
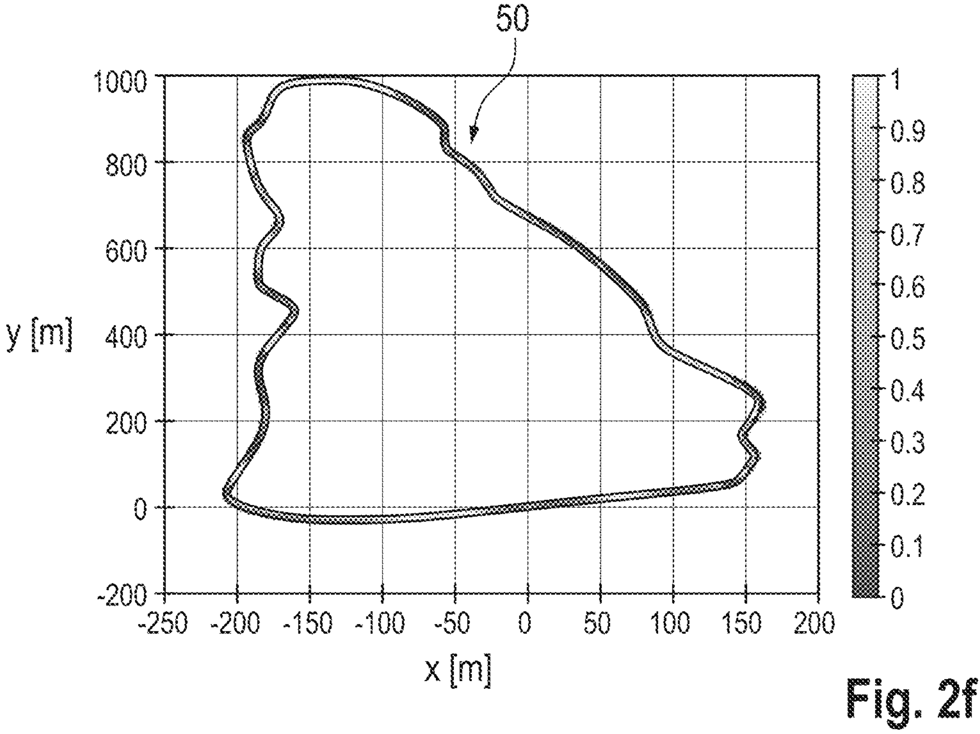

For the two unknown routes 44 and 48, a quantity that is characteristic of an uncertainty can now be determined in each case for each data point or rather route point (or even route section), in that for example an in this case normalized distance to the (respective) cluster centroid is determined. A normalized distance of this kind to the cluster centroid is shown along the respective routes 44 and 48 in the two illustrations 46 (see FIGS. 2*d*) and 50 (FIG. 2*f*).

A statement regarding an amount of exploration can then be made from this quantity that is characteristic of the respective uncertainty (of a route point).

Figure 3:
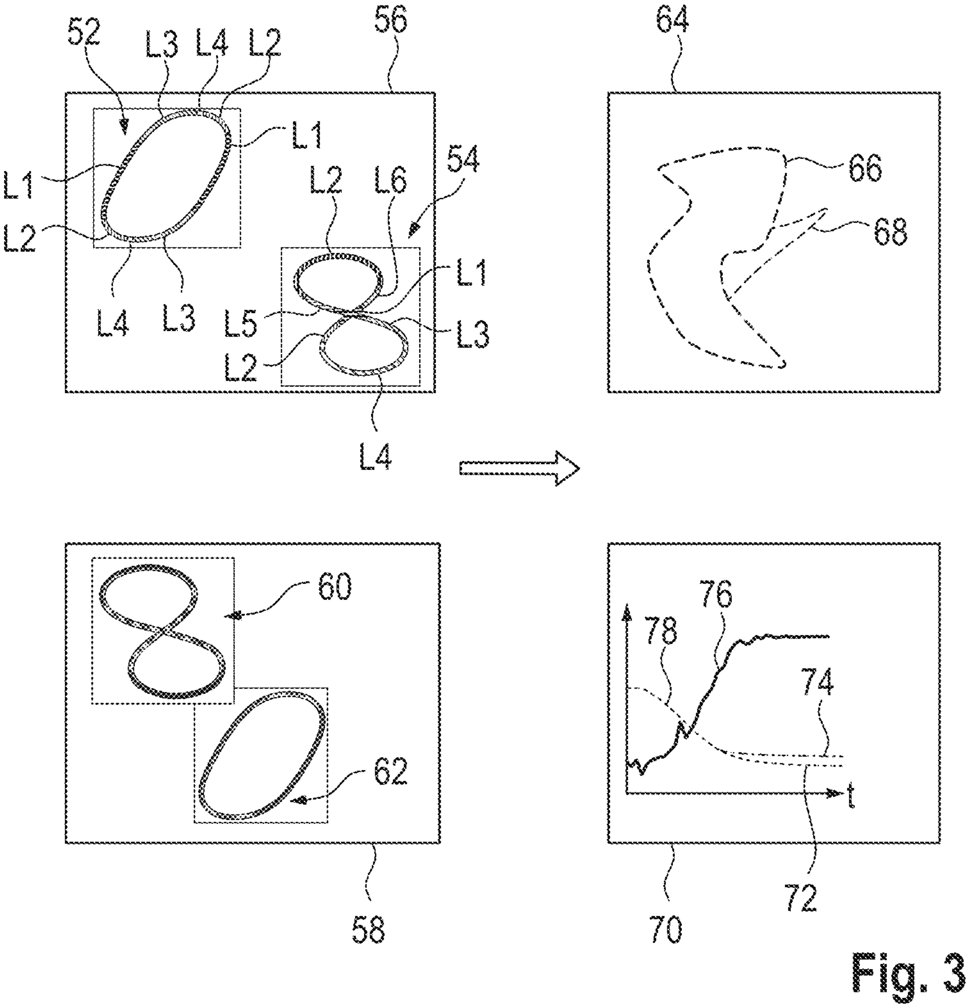
FIG. 3 is a schematic overview for safe exploration and lifelong learning in one embodiment, which can be achieved by means of the method according to clustering proposed and an uncertainty assessment.

In addition to this, a decision can be made regarding further exploration ("lifelong learning") by means of the metric, for example if the uncertainty is high in certain regions and further exploration does not pose any safety concerns here. This is illustrated in FIG. 3.

The clustering procedure is firstly illustrated again by means of the top left image 56. Clustering of two (here in each case closed) paths or rather routes 52, 54 is carried out for the data selection based on features of a planned trajectory such as curvature, speed, or acceleration. This produces the paths or rather routes 52, 54 subdivided according to different clusters L1 to L6.

The bottom left image 58 illustrates an uncertainty assessment. For this purpose, a performance evaluation can be carried out, in that, for example, an uncertainty is calculated based, for example, on a distance metric (and on the basis of the preceding clustering).

This allows for safe exploration, as illustrated in the top right image 64. For example, during exploration, a prediction of a trajectory 68 that deviates from a known trajectory 66 with regard to a performance (of the control apparatus or rather agent) can be made and, based on this, an exploration strategy can be adapted depending on an uncertainty. For example, for safe exploration, the performance is determined or predicted in an unknown state space. For example, an exploration strategy can be adapted with respect to the uncertainty.

The prediction of the uncertainty of various future driving situations can influence the exploration rate, even before this situation arises.

This has benefits, above all from a control engineering point of view, since an improved signal curve can be achieved. Therefore, the exploration can be restricted at an early stage during safety-critical driving maneuvers, such that no hazardous situation can arise due to additional exploration.

In addition, "lifelong learning" is made possible.

More added value is created by an approach for determining when exploration is necessary and when not. Many scientific works on exploration strategies deal with the question of which action should be explored (Garcia, Francisco M., and Philip S. Thomas. "A meta-MDP approach to exploration for lifelong reinforcement learning." arXiv preprint arXiv:1902.00843 (2019)), but not when exploration should and should not take place. However, the latter is directly related to the field of lifelong learning. A convergence of the exploration rate is also required for the convergence of the algorithm, and therefore exploration cannot take place continuously at will. However, in fields in which the state space has not yet been sufficiently explored or in new driving situations, further exploration is well and truly desired. A metric for determining when further exploration should take place and when not can therefore address the problem of convergence and, at the same time, handle new driving situations, changing vehicle properties, or customer wishes.

In the case of deterministic policies (methods) known from the prior art, the exploration is purely a function of time [y(t)].

By means of the method proposed here, the exploration can be decoupled from the temporal component in the deterministic case, such that the exploration is no longer exclusively a function of time but rather a function of time and uncertainty, e.g. y(t, Sigma). Typically, the exploration rate is expected to decrease over time and may reach zero over a predefined period of time. However, this is undesired in the case of lifelong learning, since neither should a specific period of time be defined nor should learning be stopped. However, no permanent exploration is to take place on a blanket basis.

In the case of stochastic policies, in which the policy specifies no explicit value, but rather the parameters of a probability distribution, the exploration decreases over time on account of the reward and a decision adapted hereto as to whether exploration or exploitation is desired. The reason for this is that the familiarity of the respective state has a decisive influence on the probability distribution.

If, however, an exploration rate is adapted with respect to an uncertainty, as is made possible, for example, by means of the method proposed here, exploration can for example be performed in unknown state spaces and still meet predefined requirements with respect to a certainty. Safe exploration of f this kind may beneficially prevent unstable driving situations, and therefore high driving safety can be achieved by means of the proposed method with simultaneous exploration.

FIGS. 6 to 10 explain an exemplary implementation based on measurement data from a driving attempt on the Ehra-Lessien test track.

Figure 6:
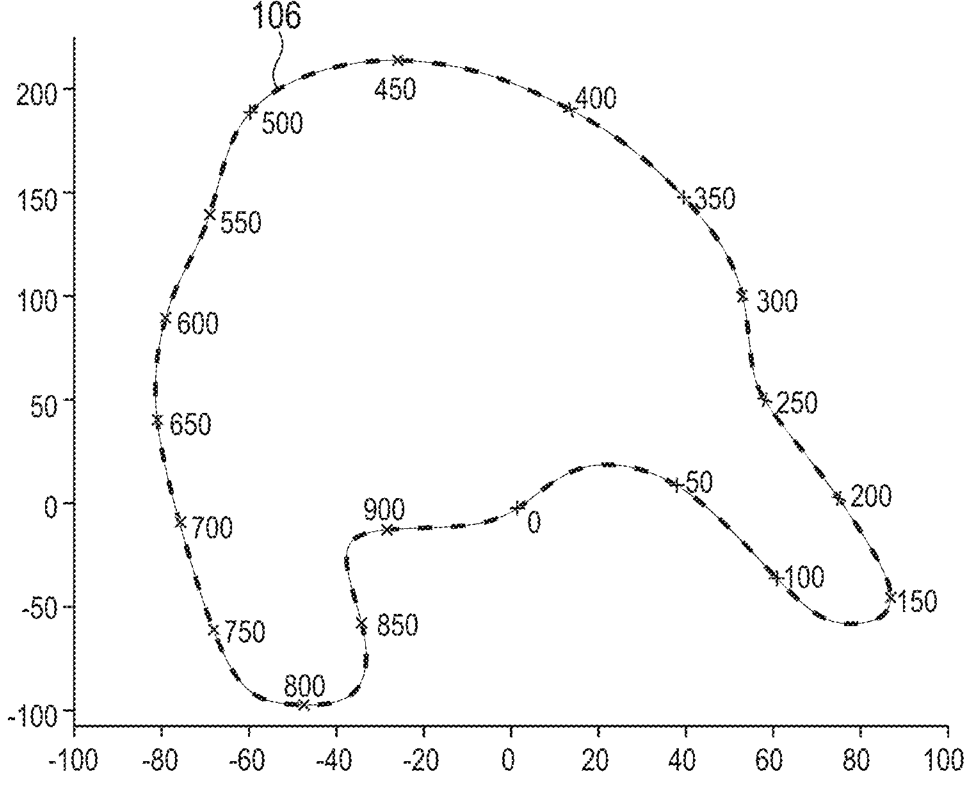
FIG. 6 shows application of a trained reinforcement learning agent.

The route 106 shown in FIG. 6 shows a travel route to be assessed or rather the evaluation route with route meters marked. The two axes represent a spatial extent of the evaluation route in two mutually perpendicular directions of a plane, for example coordinates in the x and y position (which can be converted from a global coordinate system such as GPS).

The route meter 0 denotes the lap starting point. A reinforcement learning agent was trained on the route E2 from FIG. 4 and applied to this route. Therefore, many system states (curve combinations, speed profiles, etc.) are unknown to the agent. The uncertainty is for example determined by means of a relative distance metric produced based on the clusters that were determined on the basis of the training route.

Figure 7:
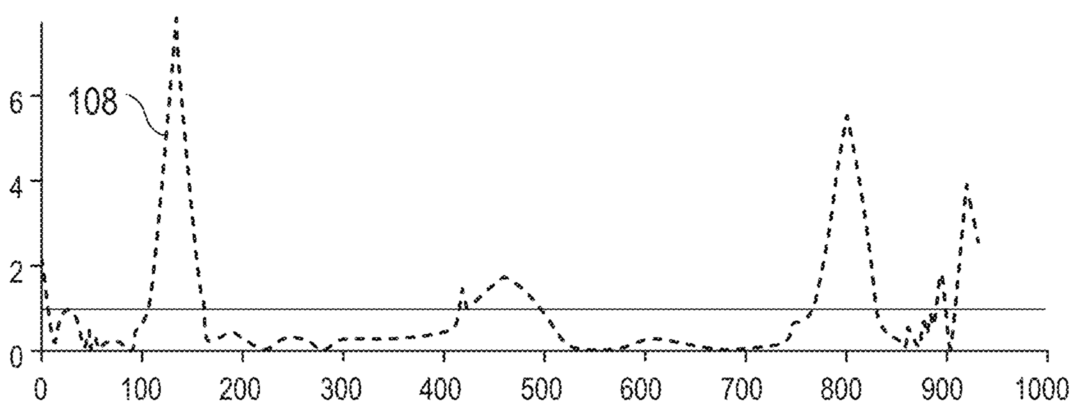
FIG. 7 shows the course of the uncertainty plotted over the route meters.

FIG. 7 shows the uncertainty 108 plotted over the route meters. An uncertainty from the value of 1 onwards was assumed as the threshold value. If the uncertainty is greater than or equal to the threshold value, the additive control signal of the reinforcement learning agent is for example turned off.

In order to produce a smooth transition, a forecast as well as a temporal reduction of the signal is used.

Figure 8:
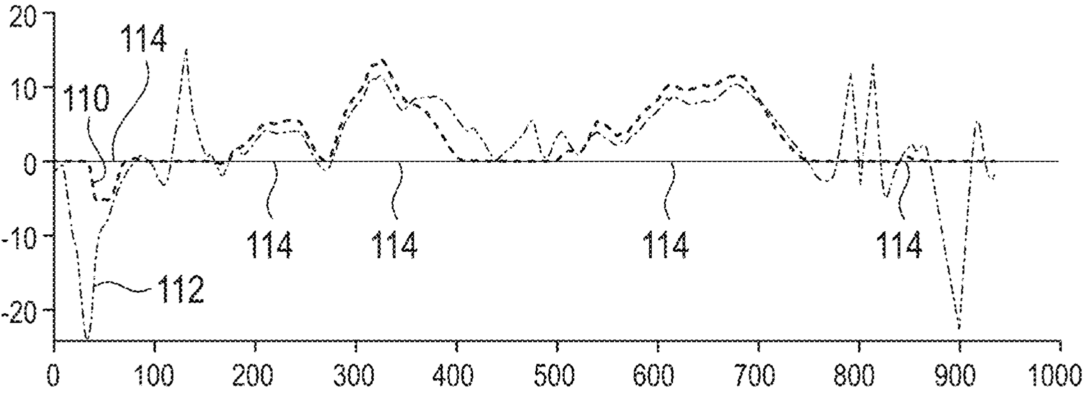
FIG. 8 shows a control signal of the agent plotted over the route meters in comparison with a consideration of the uncertainty.

FIG. 8 shows the control signal ML of the agent plotted over the route meters. The reference sign 114 denotes the zero line. The reference signal 112 represents the course of the actuation signal without the influence of the uncertainty and the reference sign 110 represents the actuation signal with consideration of uncertainty. It can be seen that, in the regions of high uncertainty (cf. FIG. 7 and reference sign 108), the agent is deactivated.

Figure 9:
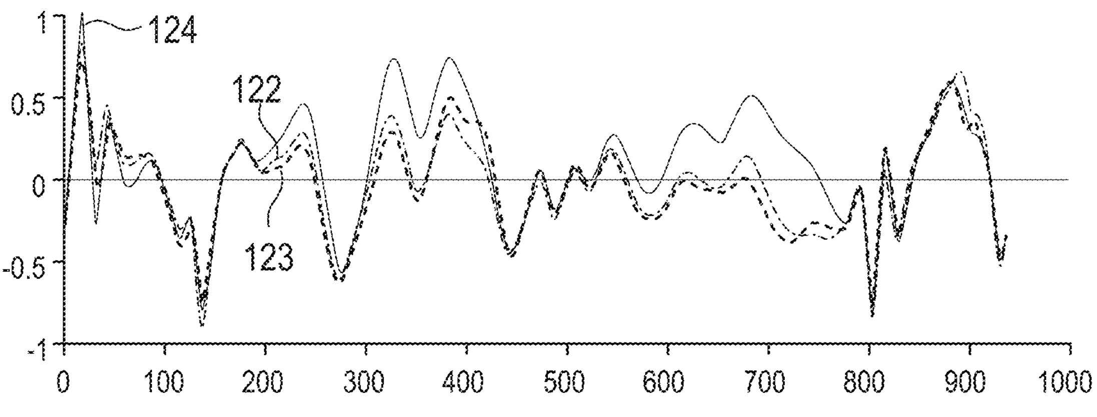
FIG. 9 shows a lateral deviation plotted over the route meters in comparison with a consideration of the uncertainty.

FIG. 9 shows the lateral deviation dy plotted over the route meters. The signal 124 represents the course of the lateral deviation without an active agent, the signal 122 with the agent permanently active, and the signal denoted by the reference sign 123 represents the lateral deviation with an active agent based on the uncertainty. During calculation of the averaged lateral deviation, the agent with consideration of the uncertainty for adapting its actuation signal leads to a minimum averaged lateral deviation in a comparison of the three variants.

Figure 10:
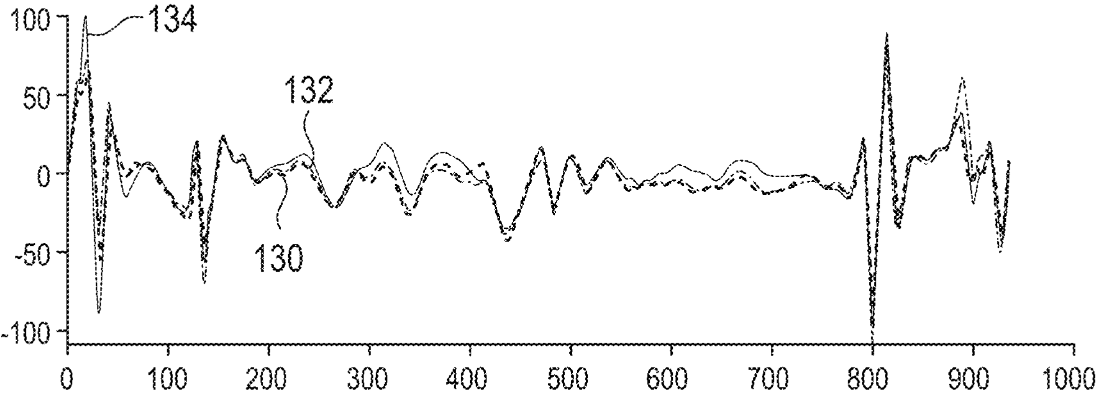
FIG. 10 shows control activity plotted over the route meters in comparison with a consideration of the uncertainty.

FIG. 10 shows the control activity FB plotted over the route meters. The reference sign 134 denotes the control activity without an active agent, the reference sign 132 denotes the control activity with a permanently active agent, and the reference sign 130 denotes the control activity with an active agent based on the uncertainty.

During calculation of the averaged control activity, the agent with consideration of the uncertainty for adapting its actuation signal also reduces the averaged control activity by a maximum in a comparison of the three variants.

The applicant reserves the right to claim all the features disclosed in the application documents. Furthermore, it is pointed out that in the individual FIGS. features were also described which may be beneficial per se. The person skilled in the art recognizes immediately that a specific feature described in a FIG. may also be beneficial without the incorporation of further features from this FIG. Furthermore, the person skilled in the art recognizes that benefits may also result from a combination of several features shown in individual FIGS. or in different FIGS.

LIST OF REFERENCE NUMERALS

1 Vehicle
10 Training route, known travel route
12 Training travel direction
14 Route data
16 Geometric values
18 Clusters
20 Segmented training route
22 Training route sections
24 Cluster center points
26 First evaluation route
28 First travel direction
30 First route sections
32 Second evaluation route
34 Second travel direction
36 Second route sections
38 Confidence measure
40 Training route
42 Representation of the normalized distance to a cluster centroid
44 Unknown route
48 Unknown route
46, 50 Representation of the uncertainty
52, 54 Path
56 Image for illustrating clustering
58 Image for illustrating an uncertainty assessment
64 Image for illustrating safe exploration
66, 68 Trajectory
70 Image for illustrating lifelong learning
80 Evaluation route
82 First travel direction
84 Evaluation route
86 Second travel direction
106 Travel route to be assessed
108 Uncertainty

110 Actuation signal with consideration of uncertainty
112 Actuation signal without influence of uncertainty
114 Zero line
122 Lateral deviation with permanently active agent
123 Lateral deviation with active agent based on uncertainty
124 Lateral deviation without active agent
E1 Evaluation route 1
E2 Evaluation route 2
F1-F10 Segments
K Curve curvature
X Route position The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for performing an at least partially automatic vehicle function of a vehicle depending on a new travel route to be assessed using a driver assistance system, the method comprising, by the driver assistance system:

obtaining route data of at least one known travel route during at least a training process, wherein the route data has been recorded while traveling on the at least one known travel route;

determining, a plurality of clusters from the route data of the at least one known travel route, wherein the clusters group the route data section-wise according to predefined geometric parameters, wherein regions of the at least one known travel route that have identical or similar geometric properties are associated to a single cluster of the plurality of clusters;

providing recorded course data that indicate a course of the new travel route to be assessed, different from the known travel route, and applying the plurality of clusters, obtained from the at least one known travel route, to the course data of the new travel route to be assessed in order to divide the new travel route to be assessed into route sections, and, as a result, to at least assign a first cluster of the plurality of clusters to a first route section;

determining at least one uncertainty quantity which is characteristic of an uncertainty with respect to the assignment made between the first route section and the first cluster assigned to said first route section, wherein the uncertainty quantity is characteristic of the uncertainty of the chosen cluster assignment and thus describes a degree of similarity of the first route section of the new travel route to be assessed to a region of the known travel route based on the geometric properties;

determining at least one control quantity as a function of the uncertainty quantity;

providing the at least one control quantity to the at least partially automatic vehicle function for performing the at least partially automatic vehicle function; wherein for each route section of the new travel route to be assessed, to which route section a cluster is assigned, a corresponding control quantity is determined depending on the respectively assigned cluster and is provided to the at least partially automatic vehicle function; and controlling the vehicle at least partially automatically using the at least partially automatic vehicle function.

2. The method of claim 1, wherein the predefined geometric parameters comprise one or more of a local curve curvature, a local curvature direction in the direction of travel, a local road width, a local distance of a vehicle trajectory along the travel route to a road edge, a local distance of a vehicle trajectory along the travel route to a lane edge, local spatial route coordinates along the travel route, a local speed of a vehicle along the travel route, and a local acceleration of a vehicle along the travel route.

3. The method of claim 2, wherein an extent of interaction of the driver assistance system for performing the vehicle function is changed and/or checked depending on the uncertainty quantity in order to determine the control quantity.

4. The method of claim 2, wherein the uncertainty quantity is assessed with respect to a future potential travel route as the new travel route to be assessed.

5. The method of claim 2, wherein the driver assistance system uses an agent to determine the control quantity, wherein the agent is configured for exploring an environment of the agent, and wherein the exploration depends on the uncertainty quantity.

6. The method of claim 1, wherein an extent of interaction of the driver assistance system for performing the vehicle function is changed and/or checked depending on the uncertainty quantity in order to determine the control quantity.

7. The method of claim 6, wherein the uncertainty quantity is assessed with respect to a future potential travel route as the new travel route to be assessed.

8. The method of claim 6, wherein the driver assistance system uses an agent to determine the control quantity, wherein the agent is configured for exploring an environment of the agent, and wherein the exploration depends on the uncertainty quantity.

9. The method of claim 1, wherein the uncertainty quantity is assessed with respect to a future potential travel route as the new travel route to be assessed.

10. The method of claim 1, wherein the driver assistance system uses an agent, to determine the control quantity, wherein the agent is configured for exploring an environment of the agent, and wherein the exploration depends on the uncertainty quantity.

11. The method of claim 1, wherein it is determined based on the uncertainty quantity when exploration is required.

12. The method of claim 1, wherein a correlation of at least a portion of the course data with respect to the route section and the assigned cluster is determined in order to determine the uncertainty quantity of a particular route section of the new travel route to be assessed.

13. The method of claim 1, the method further comprising determining a cluster center point for each cluster wherein at least the cluster center point of the cluster assigned to the course data to be assessed is taken into account during the determination of the uncertainty quantity.

14. The method of claim 1, wherein the uncertainty quantity is determined based on a relative distance metric on the basis of an arrangement of at least a portion of the course data in relation to an arrangement of at least one cluster center point of a cluster in a property space spanned by the predefined geometric parameters.

15. The method of claim 1, wherein a driving situation of the vehicle is assessed with respect to a vehicle stability and/or driving safety and the control quantity is determined depending hereon and as a function of the uncertainty quantity.

16. The method of claim 1, wherein the control quantity is a characteristic of a manipulated quantity in an adaptive control method for performing the vehicle function.

17. The method of claim 1, wherein the driver assistance system uses a teachable model and an additional training process is initiated depending on the uncertainty quantity.

18. The method of claim 17, wherein route data and/or course data are identified which cannot be clearly assigned to a cluster and/or the correlation of which with an assigned cluster is merely low, and an additional training process of the teachable model is carried out based on the identified track data and/or course data.

19. A driver assistance system for a vehicle for performing an at least partially automatic vehicle function of a vehicle depending on a new travel route to be assessed, the system configured for:

obtaining route data of at least one known travel route during at least a training process, wherein the route data has been recorded while traveling on the at least one known travel route;

determining a plurality of clusters from the route data of the at least one known travel route, wherein the clusters group the route data section-wise according to predefined geometric parameters, wherein regions of the at least one known travel route that have identical or similar geometric properties are associated to a single cluster of the plurality of clusters;

providing recorded course data that indicate a course of the new travel route to be assessed, different from the known travel route, and applying the plurality of clusters, obtained from the at least one known travel route, to the course data to be assessed in order to divide the new travel route to be assessed into route sections, and, as a result, to at least assign a first cluster to a first route section;

determining at least one uncertainty quantity which is characteristic of an uncertainty with respect to the assignment made between the first route section and the first cluster assigned to said first route section, wherein the uncertainty quantity is characteristic of the uncertainty of the chosen cluster assignment and thus describes a degree of similarity of the first route section of the new travel route to be assessed to a region of the known travel route based on the geometric properties;

determining at least one control quantity as a function of the uncertainty quantity;

providing the at least one control quantity to the at least partially automatic vehicle function for performing the at least partially automatic vehicle function; wherein for each route section of the new travel route to be assessed, to which route section a cluster is assigned, a corresponding control quantity is determined depending on the respectively assigned cluster and is provided to the at least partially automatic vehicle function; and controlling the vehicle at least partially automatically using the at least partially automatic vehicle function.

20. A vehicle comprising a driver assistance system according to claim 19.

* * * * *